(12) United States Patent
Tatenuma et al.

(10) Patent No.: US 8,260,568 B2
(45) Date of Patent: Sep. 4, 2012

(54) MOVING DIRECTION DETECTOR

(75) Inventors: Yoshinori Tatenuma, Chiyoda-ku (JP); Yuji Kawano, Chiyoda-ku (JP); Hiroshi Kobayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 590 days.

(21) Appl. No.: 12/423,583

(22) Filed: Apr. 14, 2009

(65) Prior Publication Data

US 2010/0106452 A1 Apr. 29, 2010

(30) Foreign Application Priority Data

Oct. 23, 2008 (JP) ................................. 2008-273244

(51) Int. Cl.
*G01C 9/00* (2006.01)
(52) U.S. Cl. ...................................... 702/150
(58) Field of Classification Search .................. 702/150; 324/207.25, 207.21, 173, 165
See application file for complete search history.

(56) References Cited

U.S. PATENT DOCUMENTS

| | | | | |
|---|---|---|---|---|
| 5,500,585 A | * | 3/1996 | Aab | 324/165 |
| 6,498,474 B1 | * | 12/2002 | Turner | 324/165 |
| 7,705,584 B2 | * | 4/2010 | Yokotani et al. | 324/173 |
| 2002/0030487 A1 | * | 3/2002 | Shinjo et al. | 324/207.21 |
| 2007/0182405 A1 | * | 8/2007 | Yokotani et al. | 324/207.25 |

FOREIGN PATENT DOCUMENTS

JP 2002-090181 A 3/2002

* cited by examiner

*Primary Examiner* — Jonathan C Teixeira Moffat
*Assistant Examiner* — Xiuquin Sun
(74) *Attorney, Agent, or Firm* — Sughrue Mion, PLLC

(57) ABSTRACT

Provided is an apparatus for detecting a moving direction that can accurately detect the position, regardless of the moving direction. The moving direction detector includes groups of sensor elements that face a moving body to output detection signals in accordance with travel of the moving body. The detector includes signal processing units that convert output signals of the groups of sensor elements into rectangular waves and a moving direction detection unit that outputs a signal corresponding to a moving direction of the moving body based on the detection signals from the groups of sensor elements. The moving direction detection unit includes a delay function of generating an output signal at a time instant that is delayed by a predetermined time from a time instant when a moving direction of the moving body is changed.

4 Claims, 21 Drawing Sheets

FIG. 1
(a)
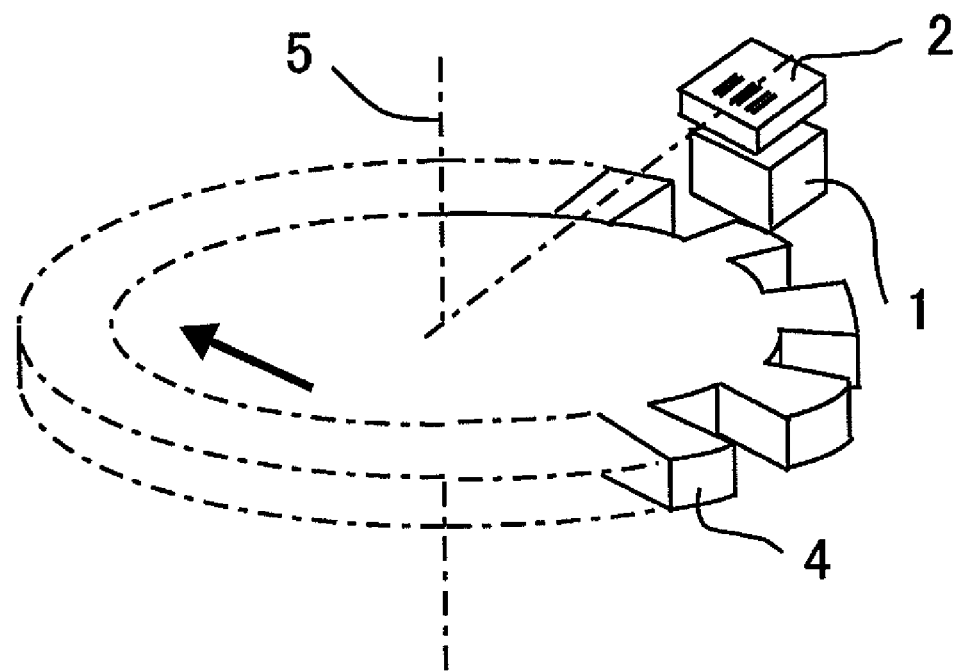
(b)
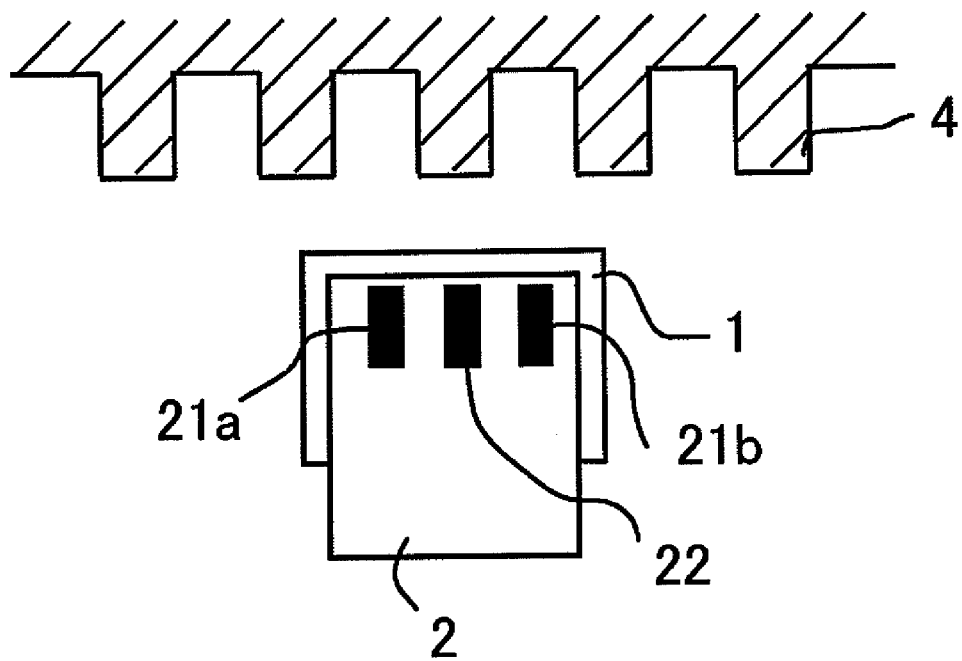

FIG. 3B

TABLE FOR DIRECTION DETECTION CIRCUIT 310

|           | e | OUTPUT |
|-----------|---|--------|
| f RISING  | 0 | 0      |
| f RISING  | 1 | 1      |
| f FALLING | 0 | 1      |
| f FALLING | 1 | 0      |

TABLE FOR MASK DETERMINATION CIRCUIT 311

|                   | e | OUTPUT |
|-------------------|---|--------|
| f RISING          | 0 | 1      |
| f RISING/FALLING  | 1 | 0      |
| f FALLING         | 0 | 1      |
| f RISING/FALLING  | 1 | 0      |

TABLE FOR INVERTING CIRCUIT 312

| g1 | g | f | f1 |
|----|---|---|----|
| 0  | 0 | 0 | 0  |
| 0  | 0 | 1 | 1  |
| 0  | 1 | 0 | 1  |
| 0  | 1 | 1 | 0  |
| 1  | 0 | 0 | 1  |
| 1  | 0 | 1 | 1  |
| 1  | 1 | 0 | 1  |
| 1  | 1 | 1 | 1  |

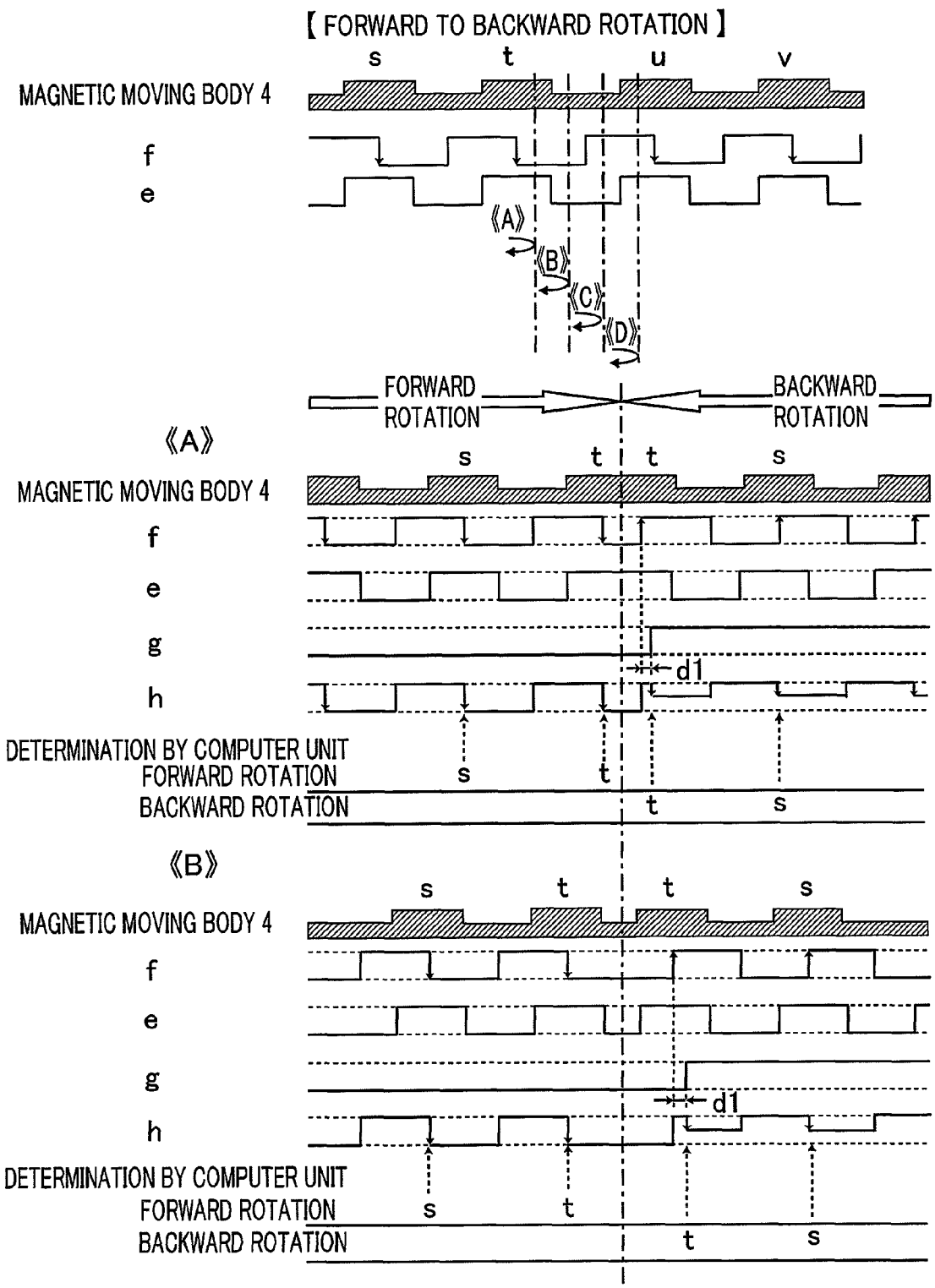

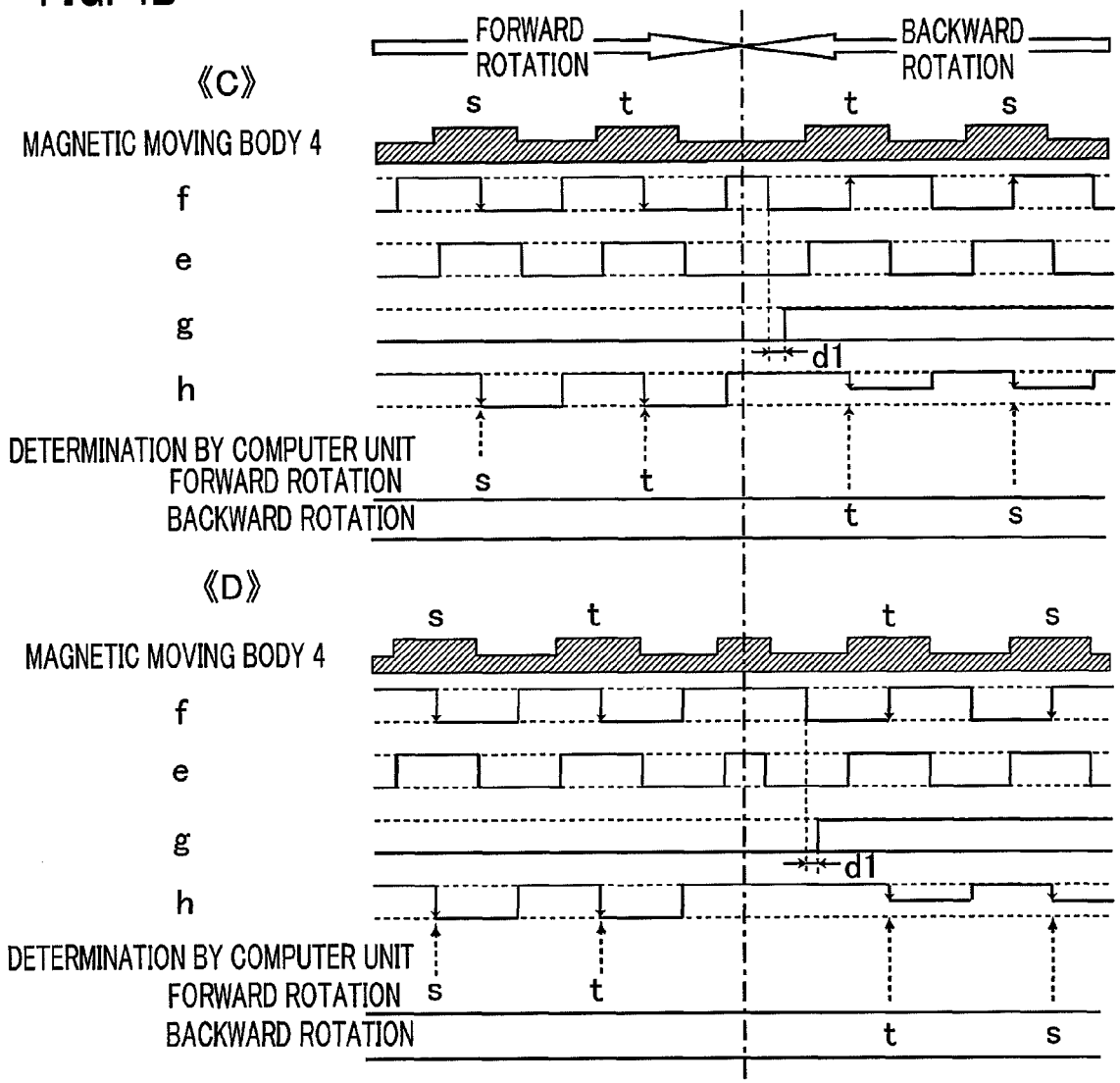

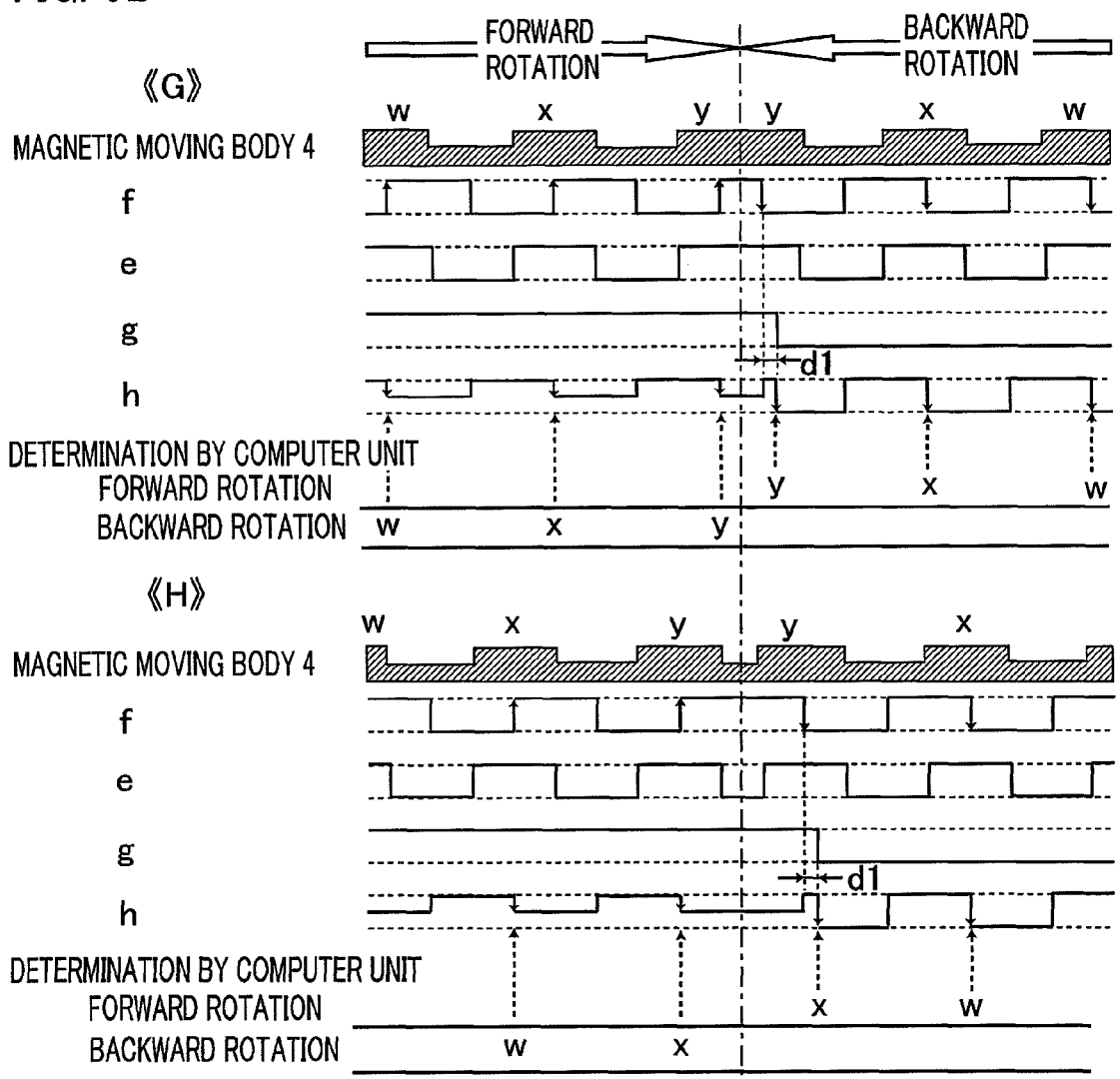

FIG. 7B

TABLE FOR DIRECTION DETECTION CIRCUIT 310

|           | e | OUTPUT |
|-----------|---|--------|
| f RISING  | 0 | 0      |
| f RISING  | 1 | 1      |
| f FALLING | 0 | 1      |
| f FALLING | 1 | 0      |

TABLE FOR MASK DETERMINATION CIRCUIT 311

|                   | e | OUTPUT |
|-------------------|---|--------|
| f RISING          | 0 | 1      |
| f RISING/FALLING  | 1 | 0      |
| f FALLING         | 0 | 1      |
| f RISING/FALLING  | 1 | 0      |

TABLE FOR INVERTING CIRCUIT 312

| g1 | g | f | f1 |
|----|---|---|----|
| 0  | 0 | 0 | 0  |
| 0  | 0 | 1 | 1  |
| 0  | 1 | 0 | 1  |
| 0  | 1 | 1 | 0  |
| 1  | 0 | 0 | 1  |
| 1  | 0 | 1 | 1  |
| 1  | 1 | 0 | 1  |
| 1  | 1 | 1 | 1  |

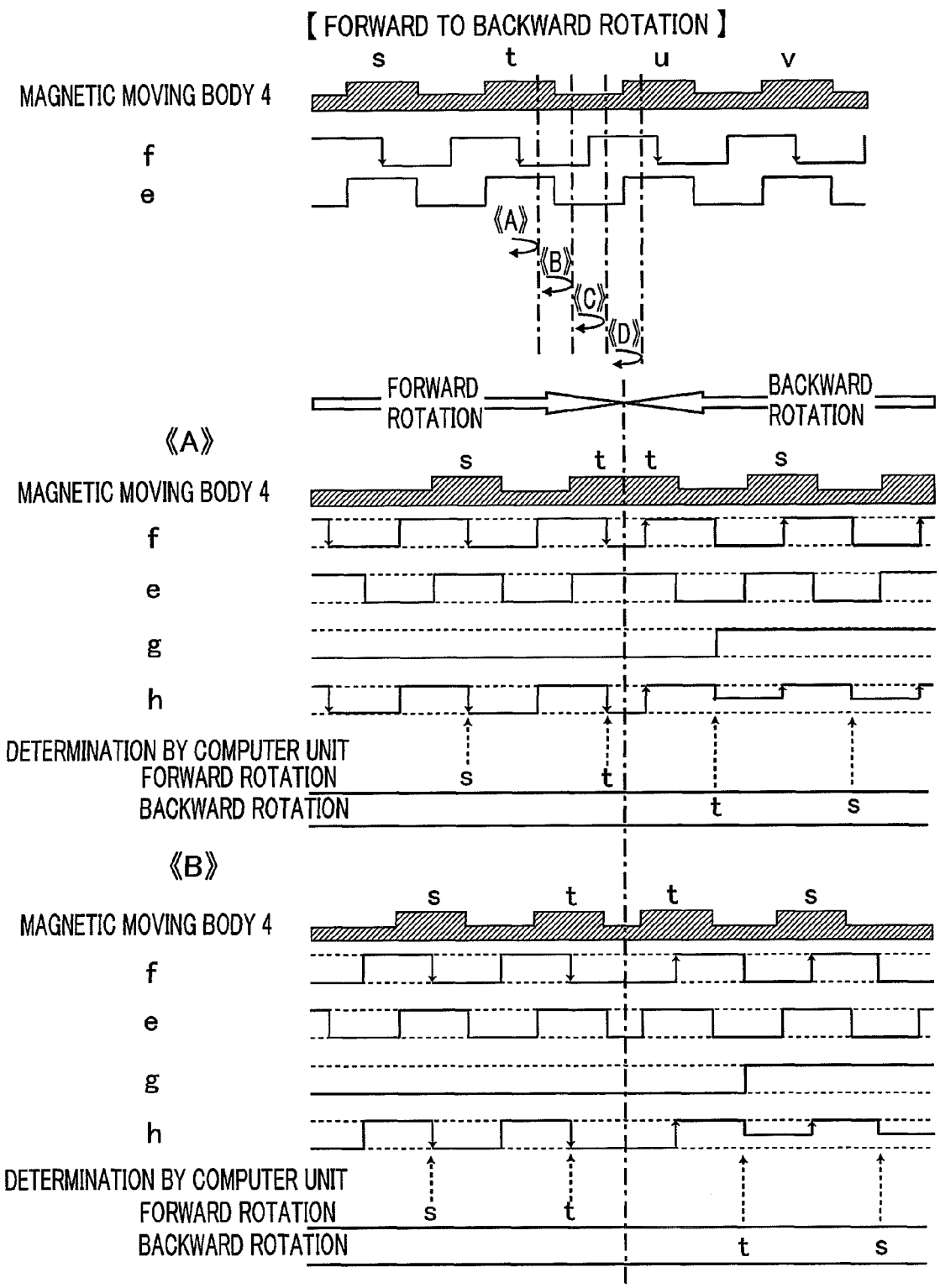

MOVING DIRECTION DETECTOR

BACKGROUND OF THE INVENTION

1. Field of the Invention

The present invention relates to a moving direction detector that detects the moving direction and the position of a moving body by use of two groups of sensor elements.

2. Description of the Related Art

For example, there exists a moving direction detection method of detecting change in a magnetic field; in the foregoing method, respective electrodes are formed at the ends of magnetoresistance elements included in a giant magnetoresistance element (referred to as a GMR, hereinafter) GMR as a magnetoelectric conversion element so that a bridge circuit is configured; a constant-voltage and constant-current power source is connected between two electrodes, of the bridge circuit, that face each other; and a voltage change obtained through conversion of a resistance change of the magnetoresistance element is applied to the foregoing magnetoresistance element. An example of prior art is disclosed in Japanese Patent Application Laid-Open No. 2002-90181.

A conventional moving direction detector will be explained with reference to the accompanying drawings. FIG. 1 is a set of views illustrating the configuration of a moving direction detector. Because the moving direction detector in FIG. 1 according to the present invention has a configuration in common with the conventional moving direction detector, both the conventional detector and a detector according to the present invention will be explained with reference to FIG. 1. FIG. 1(a) is a perspective view; FIG. 1(b) is an enlarged plan view in the case where the perspective view is viewed from above.

As illustrated in FIG. 1, the moving direction detector is provided with a processing circuit unit 2 including two groups of sensor elements, i.e., magnetoresistance elements 21a and 21b, and 22; a magnet 1 disposed in the vicinity of the processing circuit unit 2; and a gear-shaped magnetic moving body 4 that has tooth-shaped protrusions facing the magnet 1 and rotates on a rotation axis 5. The magnetoresistance elements 21a, 21b, and 22 are arranged in a row along the moving direction of the magnetic moving body 4 and perceive a change in the magnetic field produced by the magnet 1, in accordance with the rotation of the magnetic moving body 4.

FIG. 10 is a diagram illustrating a conventional processing circuit unit for a moving direction detector utilizing magnetoresistance elements. In FIG. 10, the conventional processing circuit unit is configured with a first bridge circuit 301 including a magnetoresistance element 22 as a side and resistors 31 to 33, a second bridge circuit 302 including magnetoresistance elements 21a and 21b as two sides and resistors 34 and 35, a first comparison circuit 303 connected with the first bridge circuit 301, a second comparison circuit 304 connected with the second bridge circuit 302, a direction detection circuit 305 whose D terminal is connected with the output terminal of the first comparison circuit 303 and whose CL terminal is connected with the output terminal of the second comparison circuit 304 and that includes a D-type flip-flop, an OR circuit 306, output transistors 307 and 308, a resistor 309, and a computer unit 401.

In FIG. 10, the computer unit 401 connected with the output terminal of the output transistor 307 is provided with a third comparison circuit 402 in which the connection point 45 between resistors 41 and 42 is a point of a comparison level 1, and a fourth comparison circuit 403 in which the connection point 46 between resistors 43 and 44 is a point of a comparison level 2.

In FIG. 10, reference characters c to j located at respective points of the circuit denote signals at those points. A constant voltage VCC is applied to the bridge circuit 301 and the bridge circuit 302 that are configured with the magnetoresistance elements 21a, 21b, and 22 and the fixed resistors 31 to 35. Changes in the resistances of the magnetoresistance elements 21a, 21b, and 22 due to a change, in the magnetic field produced by the magnet 1, in response to the rotation of the magnetic moving body 4 are converted into voltage changes c and d. The signals c and d, which are voltage changes, are inputted to the first comparison circuit 303 and the second comparison circuit 304, respectively. Output voltages e and f, obtained through comparison with respective predetermined voltages and conversion into rectangular waves in the first comparison circuit 303 and the second comparison circuit 304, are inputted to the direction detection circuit 305, and then a direction signal g that indicates the moving direction of the magnetic moving body 4 is outputted. Next, the direction signal g outputted from the direction detection circuit 305 and the output signal f of the second comparison circuit 304 are inputted to the OR circuit 306, and then the respective output signals of the OR circuit 306 turn on or off the output transistors 307 and 308. Reference character h denotes the output signal of the transistor 307.

Here, while representing one of the moving directions of the magnetic moving body 4 as "a forward rotation" and the other as "a backward rotation", and referring to the clockwise rotation as a forward rotation and the counterclockwise rotation as a backward rotation in the case where the magnetic moving body 4 is viewed from above in FIG. 1(a), the operation of the moving direction detector illustrated in FIG. 10 will be explained.

In FIG. 10, for example, in the case where the magnetic moving body 4 rotates forward, only the output transistor 307 is turned on or off; in the case where the magnetic moving body 4 rotates backward, only the output transistor 308 is turned on or off. Because the resistor 309 is inserted between the collector of the output transistor 308 and the collector of the output transistor 307, the level of the output voltage h is either a high level (the level denotes a voltage level, and the same, hereinafter) or a low level when the magnetic moving body 4 rotates forward; the level of the output voltage h is either a middle level or the low level when the magnetic moving body 4 rotates backward. Because, as described above, the level of the output of the processing circuit unit changes depending on whether the magnetic moving body 4 rotates forward or backward, the computer unit 401 that receives the output of the processing circuit unit can discriminate the moving direction of the magnetic moving body 4.

FIG. 11 represents signal waveforms at respective points in the detector illustrated in FIG. 10 in the case where the magnetic moving body 4 rotates on the rotation axis 5. Each of reference characters c to j in FIGS. 11 to 13 denotes a signal waveform at a point that has the same character in FIG. 10. In other words, character c denotes the output signal of the bridge circuit 301; character d denotes the output signal of the bridge circuit 302; character e denotes the output signal of the first comparison circuit 303; character f denotes the output signal of the second comparison circuit 304; character g denotes the output signal of the direction detection circuit 305; character h denotes the output signal of the output transistor 307; character i denotes the output signal of the third comparison circuit 402; and character j denotes the output signal of the fourth comparison circuit 403.

When the magnetic moving body 4 illustrated in FIG. 1 rotates on the rotation axis 5, the magnetic moving body 4 affects the magnetic field produced by the magnet 1, so that the magnetic field applied to the magnetoresistance elements 21a, 21b, and 22 is changed. FIG. 11(a) represents respective waveforms at points in the case where the magnetic moving body 4 rotates forward; FIG. 11(b) represents respective waveforms at points in the case where the magnetic moving body 4 rotates backward. As represented in FIG. 11, the respective output signals c and d of the bridge circuits 301 and 302 can be obtained in accordance with the depression/protrusion-shaped teeth of the magnetic moving body 4. The resistance values of the magnetoresistance elements 21a, 21b, and 22 change in accordance with the magnetic field applied thereto, and the changes in the resistance values result in changes in the voltages. The first comparison circuit 303 switches the output signal c, of the bridge circuit 301 in accordance with the shapes of the teeth of the magnetic moving body 4 so as to output the signal e, i.e., the rectangular wave, having a high level or a low level. The second comparison circuit 304 switches the output signal d of the bridge circuit 302 at a timing corresponding to the approximately middle point of a protrusive tooth of the magnetic moving body 4 so as to output the signal f, i.e., the rectangular wave having a high level or a low level.

In the signals f and h represented in FIG. 11, each of the arrows at the points where the rectangular wave is changed shows the switching direction, of the rectangular wave, at a timing corresponding to a point in the vicinity of the middle of the protrusive shape of a tooth of the magnetic moving body 4; for example, because, in FIG. 11(a), the level of the rectangular wave of the signal f is changed from a high level to a low level, at a timing corresponding to a point in the vicinity of the middle of the protrusive shape of a tooth of the magnetic moving body 4, the arrow is oriented in a direction from the high level to the low level; in contrast, because, in FIG. 11(b), the level of the rectangular wave of the signal f is changed from a low level to a high level, at a timing corresponding to a point in the vicinity of the middle of the protrusive shape of a tooth of the magnetic moving body 4, the arrow is oriented in a direction from the low level to the high level.

Here, attention will be paid to the output signal f of the second comparison circuit 304. The phase of the output signal f changes by 180° (it is assumed that a duration, between a rectangular wave switching position and the following rectangular wave switching position, including one high level and one low level corresponds to 360°, and the same, hereinafter) depending on the moving direction of the magnetic moving body 4, i.e., the forward rotation (a) or the backward rotation (b); therefore, for example, in the case where, at a falling timing of the rectangular wave of the signal f, the level of the rectangular wave of the signal e is high, it is determined that the magnetic moving body 4 rotates forward, and in the case where, at a falling timing of the rectangular wave of the signal f, the level of the rectangular wave of the signal e is low, it is determined that the magnetic moving body 4 rotates backward. Then, the direction detection circuit 305 outputs the low-level (forward rotation) output signal g or the high-level (backward rotation) output signal g, and the output signal f of the second comparison circuit 304 and the output signal g of the direction detection circuit 305 are inputted to the OR circuit 306, so that the waveforms, represented in FIGS. 11(a) and 11(b), of the output signal h of the output transistor 307 can be obtained.

In other words, when the magnetic moving body 4 rotates forward, the output level of the signal h becomes high or low, in accordance with the protrusion or depression as the shape of the teeth of the magnetic moving body 4; when the magnetic moving body 4 rotates backward, the output level of the signal h becomes high or middle, in accordance with the protrusion or depression as the shape of the teeth of the magnetic moving body 4.

The output signal h of the output transistor 307 is inputted to the computer unit 401; in the third comparison circuit 402, the output signal h is compared with a predetermined comparison level 1 that is applied to the connection point 45 between the resistors 41 and 42, and in the fourth comparison circuit 403, the output signal h is compared with a predetermined comparison level 2 that is applied to the connection point 46 between the resistors 43 and 44, so that the output signals i and j are obtained. When the magnetic moving body 4 rotates forward, both the output signals i and j become rectangular waves, and when the magnetic moving body 4 rotates backward, the output signal i becomes a rectangular wave, but no rectangular wave as the output signal j is outputted; therefore, the computer unit 401 can determine the moving direction of the magnetic moving body 4, by checking the output signals i and j.

FIGS. 12A and 12B represent that the respective occurrence timings of the signals f, e, g, and h at the respective points in the circuit illustrated in FIG. 10 change depending on a timing at which the magnetic moving body 4 changes its moving direction from the forward rotation to the backward rotation. AS the switching timing, four timings (A, B, C, and D) are represented; FIGS. 12A and 12B represent the foregoing signals f, e, g, and h and determination, performed by the computer unit 401, of whether the magnetic moving body 4 rotates forward or backward.

FIGS. 13A and 13B represent that the respective occurrence timings of the signals f, e, g, and h at the respective points in the circuit illustrated in FIG. 10 change depending on a timing at which the magnetic moving body 4 changes its moving direction from the backward rotation to the forward rotation. AS the switching timing, four timings (E, F, G, and H) are represented; FIGS. 13A and 13B represent the foregoing signals f, e, g, and h and determination, performed by the computer unit 401, of whether the magnetic moving body 4 rotates forward or backward.

Here, a prior art will be explained with reference to FIGS. 12A and 12B. By allocating symbols (s, t, u, and v) to the protrusive shapes of the teeth of the magnetic moving body 4, the computer unit 401 performs determination of the protrusive shape of the tooth of the magnetic moving body 4 and the moving direction thereof. The computer unit 401 performs determination of the moving direction based on the falling position (the timing at which the level changes from a high level to a low level, and the same, hereinafter) and the level of the rectangular wave of the signal h. For example, in the case where the magnetic moving body 4 rotates forward at the timing A, the signal h falls at a timing corresponding to a position in the vicinity of the middle of the protrusive shape of the tooth s, whereby the computer unit 401 determines that the tooth is s at a timing during the forward rotation.

However, depending on whether the position of the protrusive shape of the tooth is a position at a timing of the forward rotation or at a timing of the backward rotation, the timing when the computer unit 401 performs determination of the position of the protrusion changes. In other words, when the magnetic moving body 4 rotates forward at the timing A, the computer unit 401 performs determination of the tooth s or t during the forward rotation at a timing corresponding to the middle of the protrusive shape of the tooth s or t; in contrast, when the magnetic moving body 4 rotates backward at the timing A, the computer unit 401 performs determination of the tooth s or t during the backward rotation at a timing corresponding to the middle of the depressed shape near the tooth s or t.

Here, when being represented by a phase, the duration between the falling edge of the rectangular wave of the signal h and the following falling edge is 360°; the duration between the falling edge of the rectangular wave of the signal h and the following rising edge is 180°.

For example, when the magnetic moving body 4 rotates forward at the timing A, the computer unit 401 recognizes the symbol (s or t) of the protrusive shape of the tooth, at a timing corresponding to a position in the vicinity of the middle of the protrusive shape of the tooth; however, when the magnetic moving body 4 rotates backward at the timing A, the computer unit 401 recognizes the protrusion symbol, at a timing corresponding to a position that is 180° delayed from the protrusive shape t of the tooth. Additionally, when the magnetic moving body 4 rotates forward at the timing C, the computer unit 401 recognizes the symbol (s or t) of the protrusive shape of the tooth, at a timing corresponding to a position in the vicinity of the middle of the protrusive shape of the tooth; however, when the magnetic moving body 4 rotates backward at the timing A, the computer unit 401 recognizes the protrusion symbol, at a timing corresponding to a position that is 180° advanced from the protrusive shape t of the tooth.

Accordingly, in a conventional moving direction detector configured as described above, the computer unit can recognize the moving direction of the magnetic moving body 4; however, depending on the moving direction, it has been difficult to accurately recognize the position of the protrusive shape of the tooth of the magnetic moving body 4.

SUMMARY OF THE INVENTION

The present invention has been implemented in order to solve the foregoing problems; the objective thereof is to obtain a moving direction detector with which accurate information on the position and the moving direction of an object to be detected can be obtained, regardless of the moving direction of the object to be detected.

A moving direction detector according to the present invention is provided with first and second groups of sensor elements that face a moving body to be detected, arranged in a row along a moving direction of the moving body, and output detection signals in accordance with travel of the moving body, each of the first and second groups including one or more sensor elements; signal processing units that convert output signals of the first and second groups of sensor elements into rectangular waves; a moving direction detection unit that outputs a signal corresponding to a moving direction of the moving body, based on the detection signals from the first and second groups of sensor elements; output processing units that output signals with which a moving direction of the moving body can be determined, based on output signals of the signal processing units and an output signal of the moving direction detection unit; and an output determination unit that determines an output value of the output processing unit. The moving direction detection unit has a delay function of generating an output signal at a time instant that is delayed by a predetermined time from a time instant when a moving direction of the moving body is changed.

A moving direction detector according to the present invention demonstrates an effect that the position of a moving body to be detected can accurately be recognized and the moving direction of the moving body to be detected can be determined.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 1 is a set of views illustrating the configuration of a moving direction detector according to the present invention;

FIGS. 3A and 3B are a set of charts and a set of tables, respectively, representing waveforms at respective points in the circuit of a moving direction detector according to Embodiment 1 of the present invention;

FIGS. 4A and 4B are each a set of charts representing waveforms at respective points in the circuit of a moving direction detector according to Embodiment 1, in the case where the moving direction changes from the forward rotation to the backward rotation;

FIGS. 5A and 5B are each a set of charts representing waveforms at respective points in the circuit of a moving direction detector according to Embodiment 1, in the case where the moving direction changes from the backward rotation to the forward rotation;

FIGS. 7A and 7B are a set of charts and a set of tables, respectively, representing waveforms at respective points in the circuit of a moving direction detector according to Embodiment 2 of the present invention;

FIGS. 12A and 12B are each a set of charts representing waveforms at respective points in the circuit of a conventional moving direction detector, in the case where the moving direction changes from the forward rotation to the backward rotation.

DETAILED DESCRIPTION OF THE PREFERRED EMBODIMENTS

Embodiment 1

Figure 2:
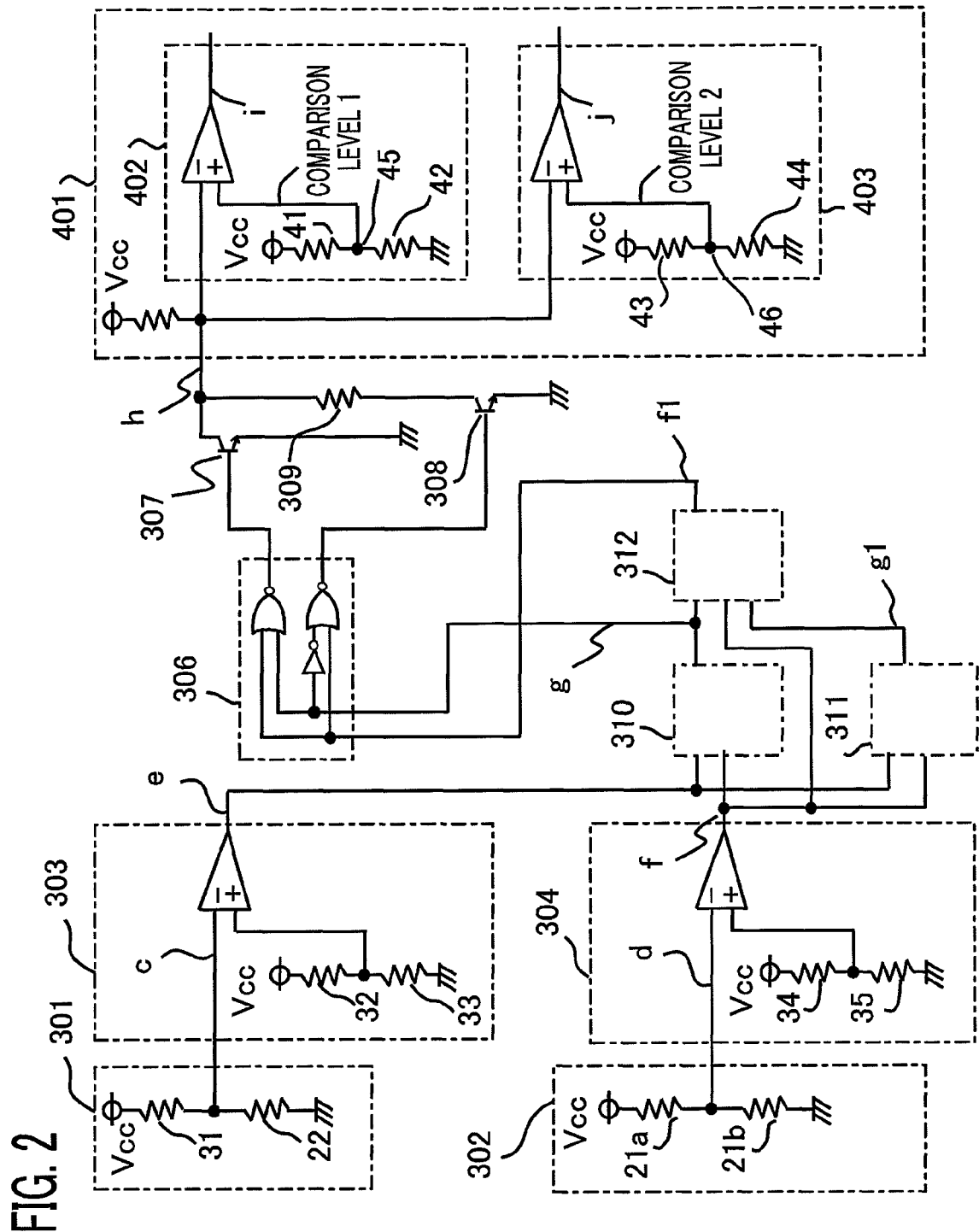
FIG. 2 is a circuit diagram illustrating a moving direction detector according to Embodiment 1 of the present invention.

A moving direction detector according to Embodiment 1 of the present invention will be explained below with reference to the accompanying drawings. FIG. 1 is a set of views illustrating the configuration of a moving direction detector according to Embodiment 1 of the present invention. FIG. 1(a) is a perspective view; FIG. 1(b) is an enlarged plan view in the case where the perspective view is viewed from above.

As illustrated in FIG. 1, the moving direction detector is provided with a processing circuit unit 2 including two groups of sensor elements, i.e., magnetoresistance elements 21a, 21b, and 22; a magnet 1 disposed in the vicinity of the processing circuit unit 2; and a gear-shaped magnetic moving body 4 that has tooth-shaped protrusions facing the magnet 1 and rotates on a rotation axis 5. The magnetoresistance elements 21a, 21b, and 22 are arranged in a row along the moving direction of the magnetic moving body 4 and perceive a change, in the magnetic field produced by the magnet 1, in accordance with the rotation of the magnetic moving body 4. The magnetoresistance elements 21a and 21b that configure one of the sensor groups are arranged spaced apart from each other by a predetermined distance along the moving direction of the magnetic moving body 14; the magnetoresistance element 22 that forms the other sensor group is disposed between the magnetoresistance elements 21a and 21b. In addition, the magnetoresistance elements 21a, 21b, and 22 included in the first and second sensor element groups perform magnetoelectric conversion through a change in the magnetic resistance caused by a change in the magnetic field; therefore, there may be adopted a method in which, instead of applying the change in the magnetic field produced by the magnet 1 to the magnetoresistance element, the magnet 1 is removed and the magnetic moving body 4 itself is magnetized, so that the change in the magnetic field is applied to the magnetoresistance element through the travel of the magnetic moving body 4.

Figure 10:
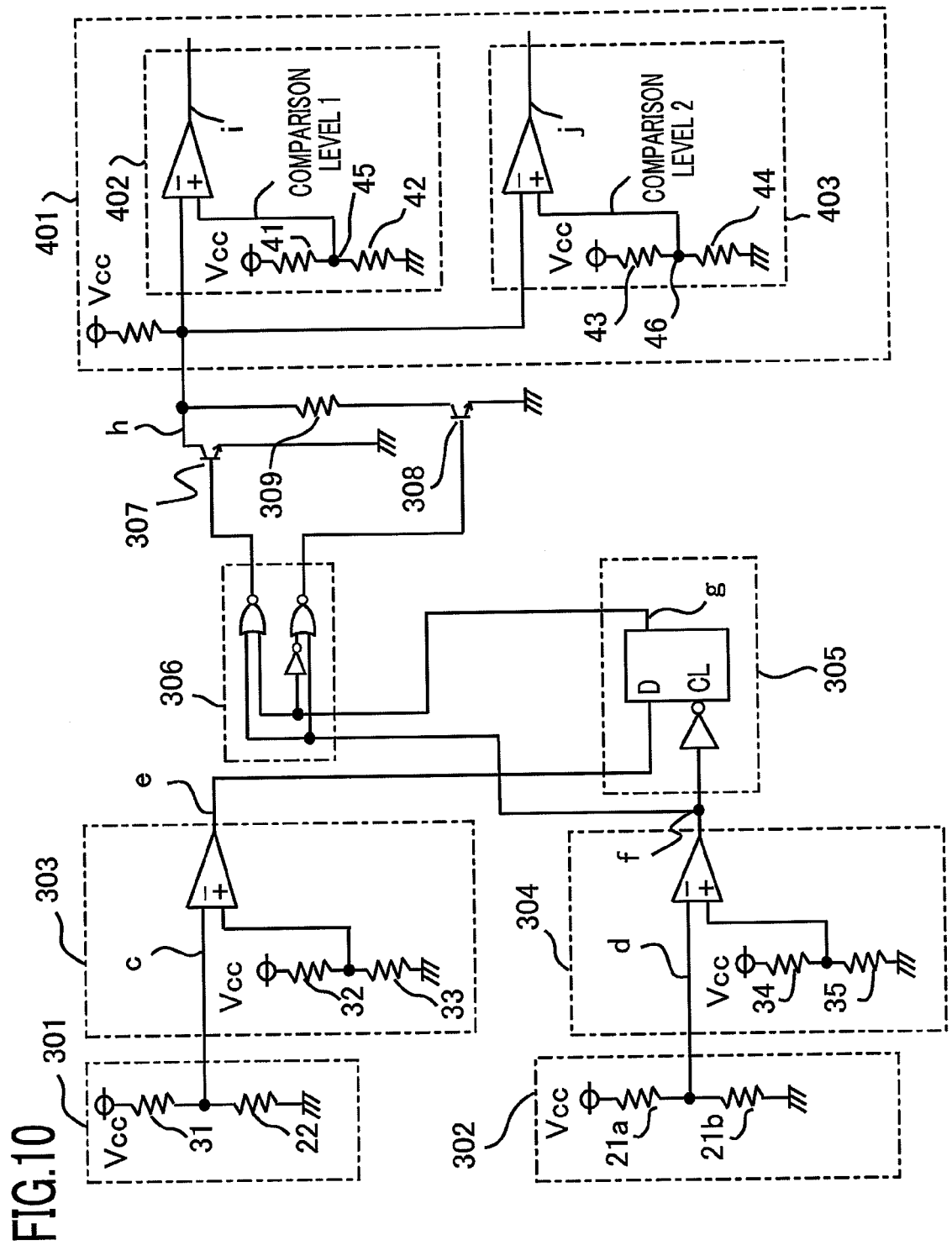
FIG. 10 is a circuit diagram of a conventional moving direction detector.

FIG. 2 illustrates a processing circuit unit of a moving direction detector, utilizing magnetoresistance elements, according to Embodiment 1 and computer unit connected with the processing circuit unit. In addition, the same or equivalent constituent elements as those in FIG. 10 are designated by the same reference characters.

In FIG. 2, the processing circuit unit 2 is configured with a first bridge circuit 301 including a magnetoresistance element 22 as a side and resistors 31 to 33; a second bridge circuit 302 including magnetoresistance elements 21a and 21b as two sides and resistors 34 and 35; a first comparison circuit 303 connected with the first bridge circuit 301; a second comparison circuit 304 connected with the second bridge circuit 302; a direction detection circuit 310 connected with the outputs of the first and second comparison circuits 303 and 304; a mask determination circuit 311 connected with the outputs of the first and second comparison circuits 303 and 304; an inverting circuit 312 connected with the outputs of the second comparison circuit 304, the direction detection circuit 310, and the mask determination circuit 311; an OR circuit 306 connected with the direction detection circuit 310 and the inverting circuit 312; output transistors 307 and 308; a resistor 309; and a computer unit 401.

Here, the first and second comparison circuits 303 and 304 are examples of signal processing units that convert the output signals of the first and second groups of sensor elements into rectangular waves. The output transistors 307 and 308 are output processing units that output a signal with which the moving direction of the magnetic moving body 4 can be determined, based on the output signals of the signal processing units and the output signal of the direction detection circuit 310, i.e., a moving direction detection unit.

In FIG. 2, the computer unit 401 connected with the output terminal of the output transistor 307 is an output determination unit and is provided with a third comparison circuit 402 in which the connection point 45 between resistors 41 and 42 is a point of a comparison level 1, and a fourth comparison circuit 403 in which the connection point 46 between resistors 43 and 44 is a point of a comparison level 2.

In FIG. 2, a constant voltage VCC is applied to the bridge circuit 301 and the bridge circuit 302 that are configured with the magnetoresistance elements 21a, 21b, and 22 and the fixed resistors 31 to 35, and changes in the resistances of the magnetoresistance elements 21a, 21b, and 22 due to a change, in the magnetic field produced by the magnet 1, in accordance with the rotation of the magnetic moving body 4 are converted into changes in voltages. The signals, which are voltage changes, are inputted to the first comparison circuit 303 and the second comparison circuit 304, respectively. Signals, obtained through comparison with respective predetermined voltages and conversion into rectangular waves in the first comparison circuit 303 and the second comparison circuit 304, turn on or off the output transistors 307 and 308, via the direction detection circuit 310, the mask determination circuit 311, the inverting circuit 312, and the OR circuit 306.

Figure 11:
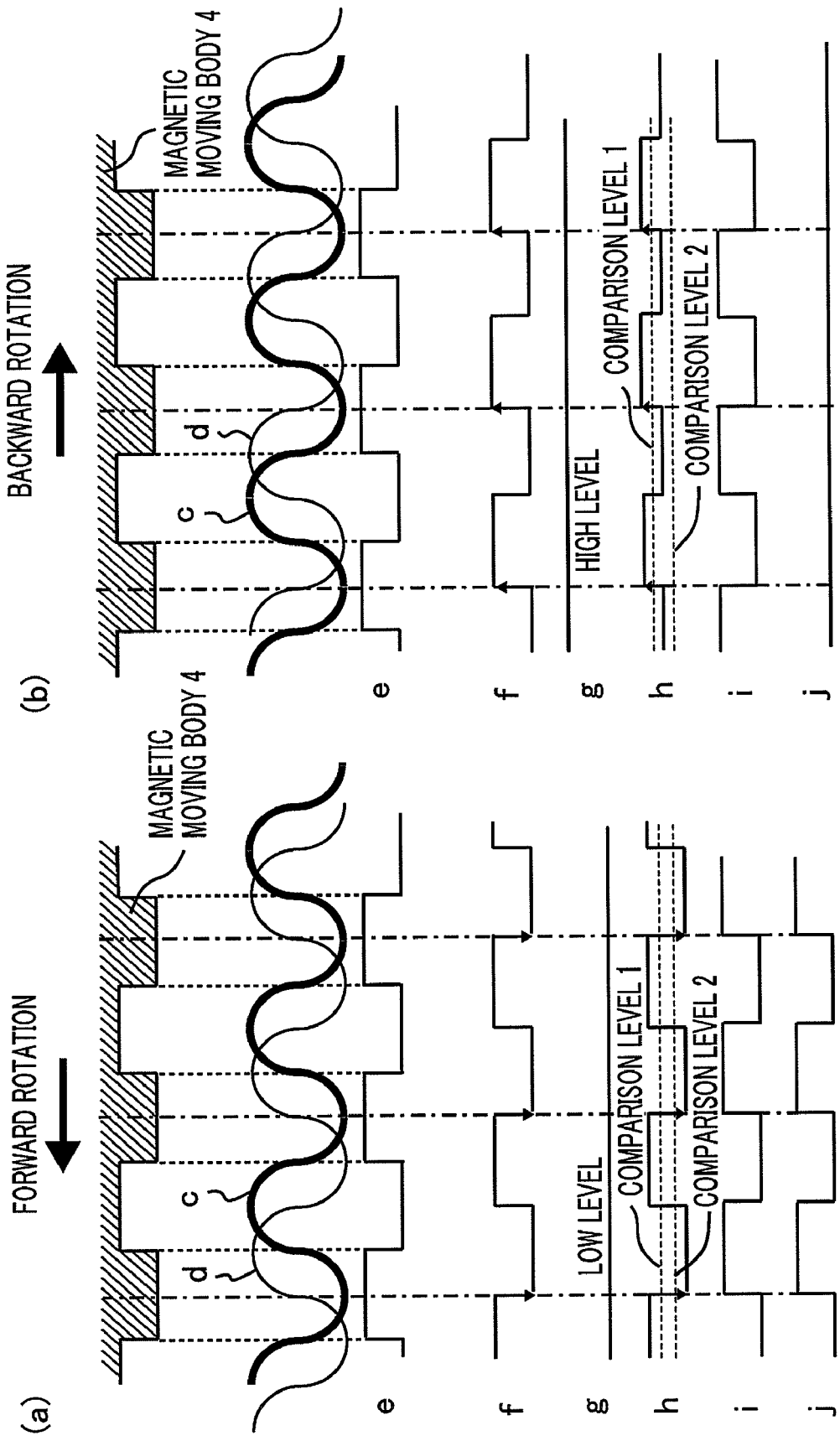
FIG. 11 is a set of charts representing waveforms at respective points in the circuit of a conventional moving direction detector.
Figure 12B:
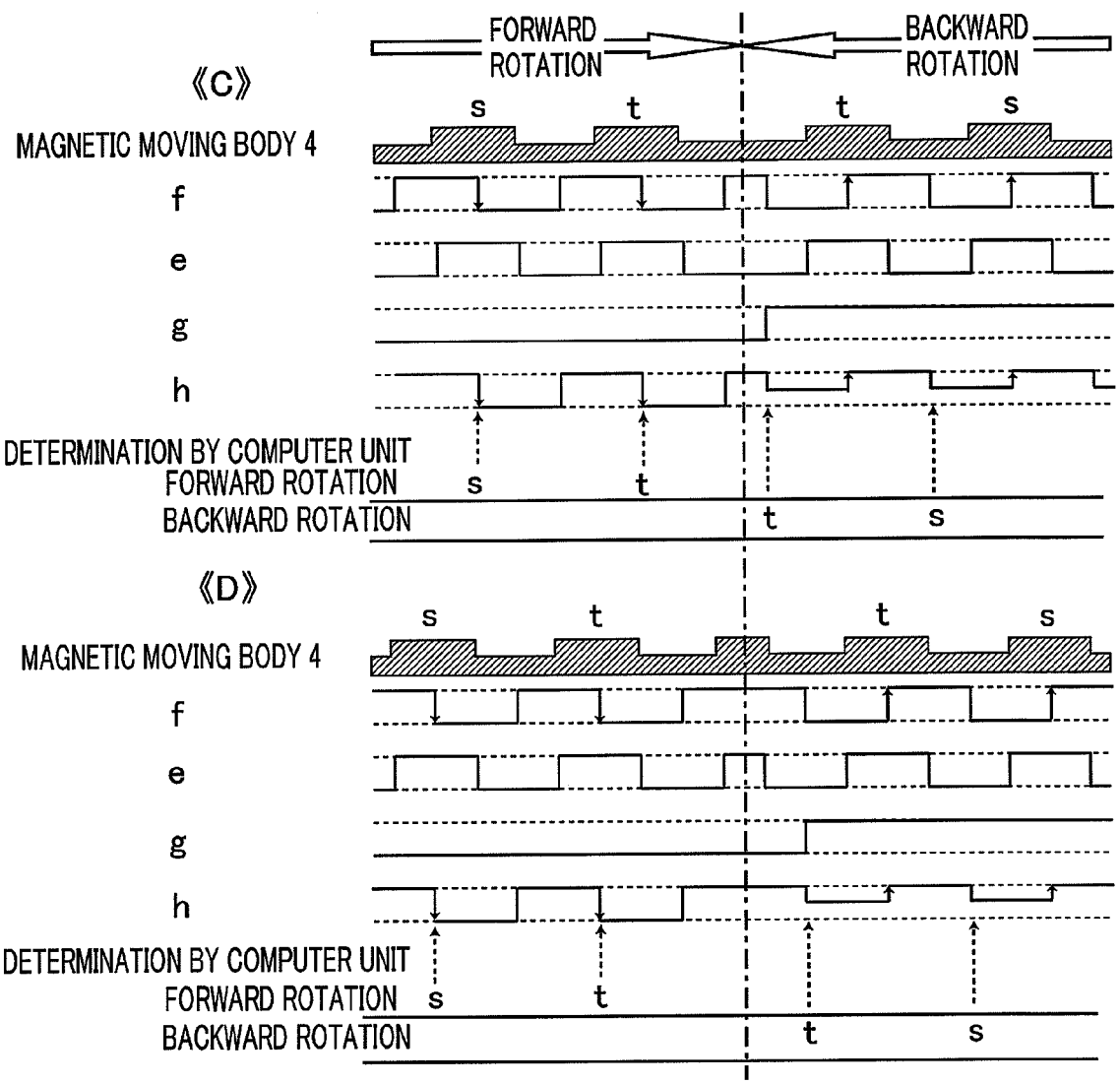
Figure 13A:
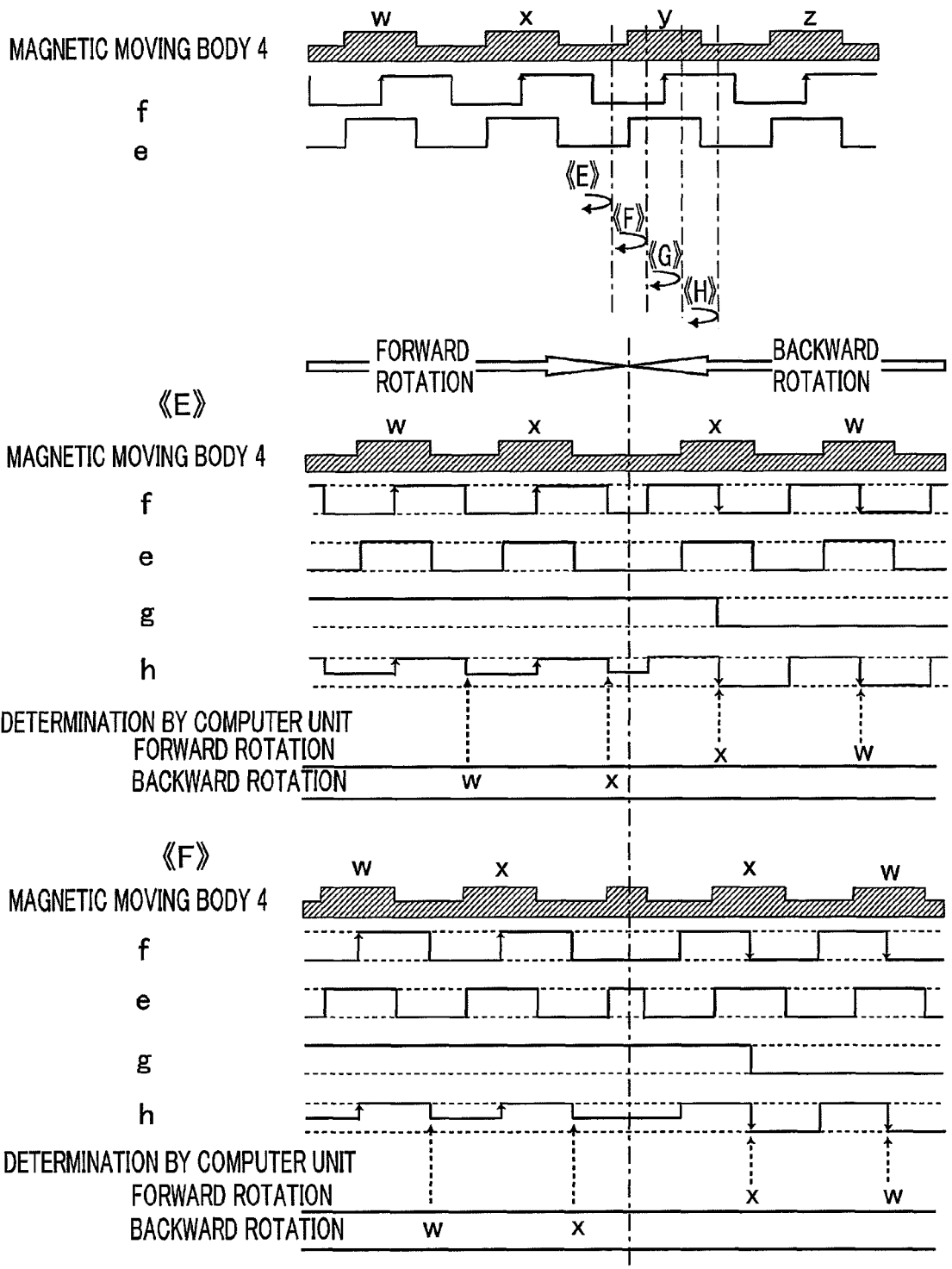
FIGS. 13A and 13B are each a set of charts representing waveforms at respective points in the circuit of a conventional moving direction detector, in the case where the moving direction changes from the backward rotation to the forward rotation.
Figure 13B:
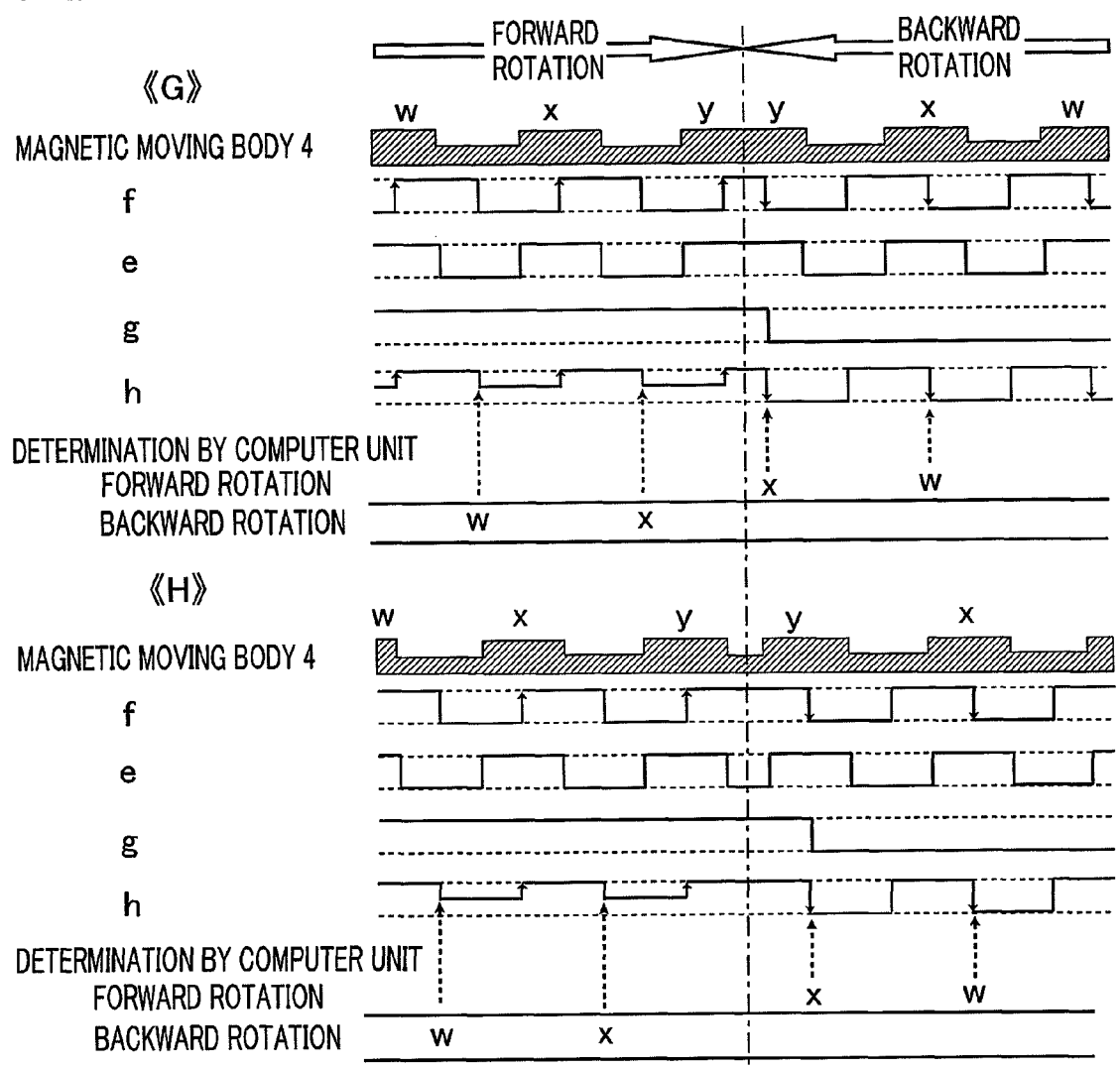

Next, the operation of the circuit illustrated in FIG. 2 will be explained below. Reference characters c to g, f1, g1, and h to j at respective points in FIG. 2 coincide with those for signal waveforms in FIG. 3A to 13B. In addition, the waveforms c to j at respective points in FIG. 2 in the case where the magnetic moving body 4 rotates on the rotation axis 5 forward or backward are the same as those that have been explained with reference to FIG. 11, except for the vicinity of the timing when the magnetic moving body 4 changes its rotation direction from the forward rotation to the backward rotation; therefore, the explanations thereof will be omitted.

Figure 3A:
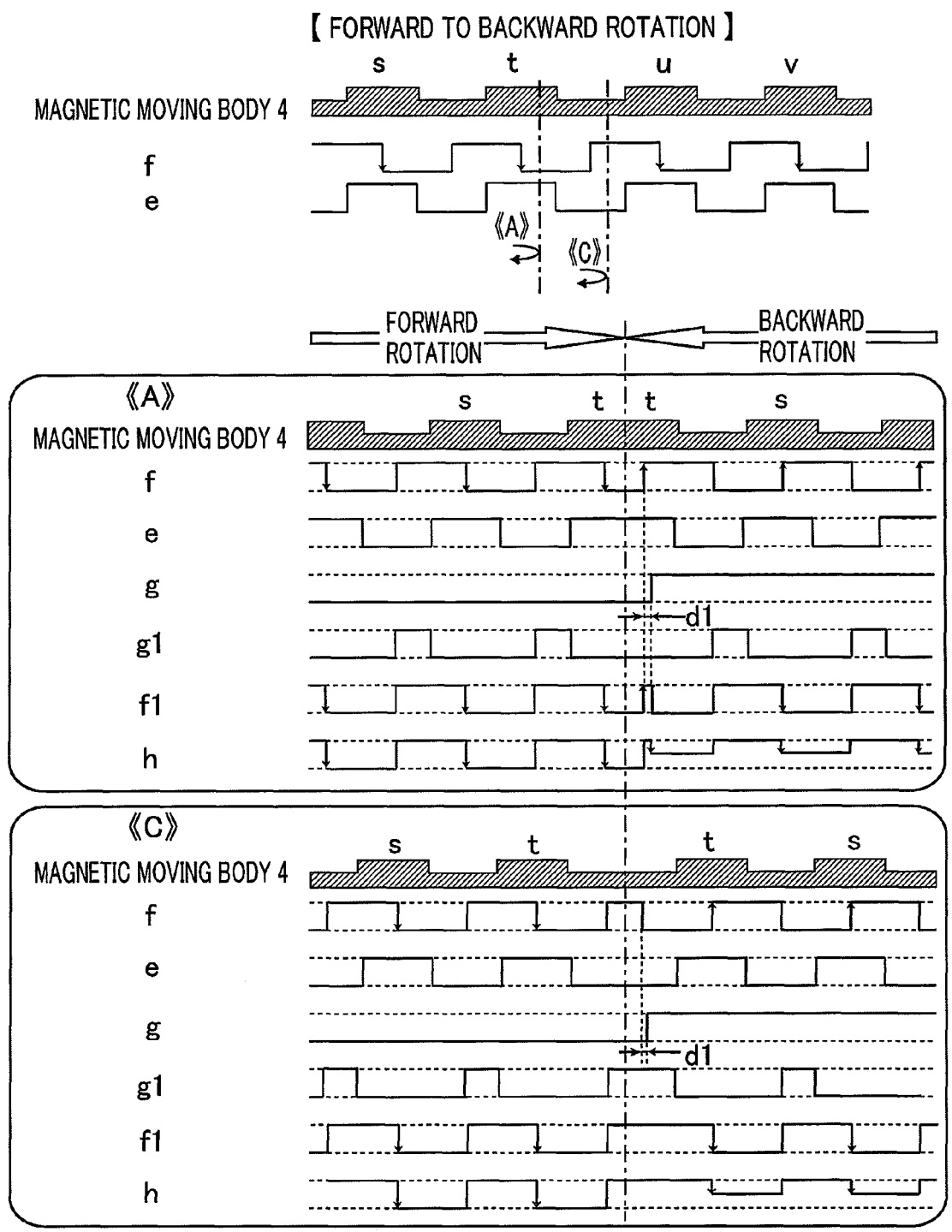

Next, the operations of the respective units in FIG. 2 will be explained with reference to FIGS. 3A and 3B. In FIG. 3A, there are set timings A and C at which the magnetic moving body 4 changes its rotation direction from the forward rotation to the backward rotation; symbols (s, t, u, and v) are designated to the protrusive shapes of the teeth of the magnetic moving body 4; and in FIG. 3B, there are included tables representing the relations between the respective signal waveforms at the points e to h, f1, and g1 and the respective inputs and output of the direction detection circuit 310, the mask determination circuit 311, and the inverting circuit 312.

The output signal g of the direction detection circuit 310 is a signal with which the moving direction of the magnetic moving body 4 is determined by checking, at the timings of the rising edge and the falling edge of the output signal f, whether the waveform of the output signal e of the first comparison circuit 303 is high-level or low-level. In the case of the timing A in FIG. 3A, the direction detection circuit 310 outputs a high-level signal at the rising edge, of the signal f, immediately after the position where the magnetic moving body 4 changes its rotation direction from the forward rotation to the backward rotation; at the timing C in FIG. 3A, the direction detection circuit 310 outputs a low-level signal at the falling edge, of the signal f, immediately after the position where the magnetic moving body 4 changes its rotation direction from the forward rotation to the backward rotation. The table for the direction detection circuit 310 represents the foregoing facts ("0" and "1" in the table denote a low level and a high level, respectively, and the same, hereinafter).

As illustrated in FIG. 3A, the moving direction of the magnetic moving body 4 is determined by the level of the output g of the direction detection circuit 310; the direction detection circuit 310 has a function of delaying the switching of the level, i.e., the determination of the moving direction by duration d1.

The mask determination circuit 311 in FIG. 2 checks the level of the signal e at the timings of the rising edge and the falling edge of the signal f; in the case where the signal e is low-level, the mask determination circuit 311 outputs the output signal g1 of a high level. However, when the level of the signal e changes to a high level, the mask determination circuit 311 outputs the output signal g1 of a low level, regardless of the rising timing or the falling timing of the signal f. The table for the mask determination circuit 311 represents the foregoing facts.

The inverting circuit 312 in FIG. 2 inverts the high level or the low level of the output signal f in accordance with the moving direction of the magnetic moving body 4. That is to say, in the case where the magnetic moving body 4 rotates forward, the output level of the signal f is maintained; in the case of the backward rotation, the high level of the signal f is inverted to the low level, and the low level of the signal f is inverted to the high level. Additionally, in the case where the signal g1 is high-level, the inverting circuit 312 outputs the signal f1 of a high level, regardless of the output level of the signal f. The table for the inverting circuit 312 represents the foregoing facts.

In the case of the timing A in FIG. 3A, the signal h rises at the timing when the magnetic moving body 4 changes its rotation direction from the forward rotation to the backward rotation and then falls after the duration d1.

Here, the delay duration d1 will be explained. In FIGS. 4A and 4B, the duration d1 is required to be set between a timing when the direction detection circuit 310 detects a reversal of the direction and a timing of the first edge (corresponding to the middle of the tooth) of the signal f (in FIGS. 4A and 4B, the first falling edge of the signal f) after the magnetic moving body 4 changes its rotation direction from the forward rotation to the backward rotation. In FIGS. 4A and 4B, the duration d1 is required to be set between a timing when the direction detection circuit 310 detects a reversal of the direction and a timing of the first edge (rising edge or falling edge) of the signal e after the direction detection circuit 310 detects the reversal of the direction. As a method of producing a delay, there exists a method in which, in the direction detection circuit 310, the delay time is counted by use of an oscillation circuit so that the edge of a rectangular wave is outputted, or a method in which a rectangular wave is made to rise and fall sluggishly by means of a time constant determined by a capacitance and a resistance. The foregoing delay is a so-called "waiting duration" for re-outputting a low-level output; in the case where, as represented in FIGS. 4A and 4B, the timing of a reversal to the forward rotation or to the backward rotation occurs when the signal f is low-level due to the forward rotation, the output of the signal f is inverted after the delay and then backward-rotation information, i.e., a middle level can be generated, by providing the delay and inverting the output of the signal f at the timing of a reversal to the forward rotation or the backward rotation; therefore, the computer unit can obtain an accurate position.

In the case of the timing C in FIG. 3A, the signal h does not fall at the timing when the magnetic moving body 4 changes its rotation direction from the forward rotation to the backward rotation, because the mask determination circuit 311 outputs the signal g1 of a low level.

Figure 5A:
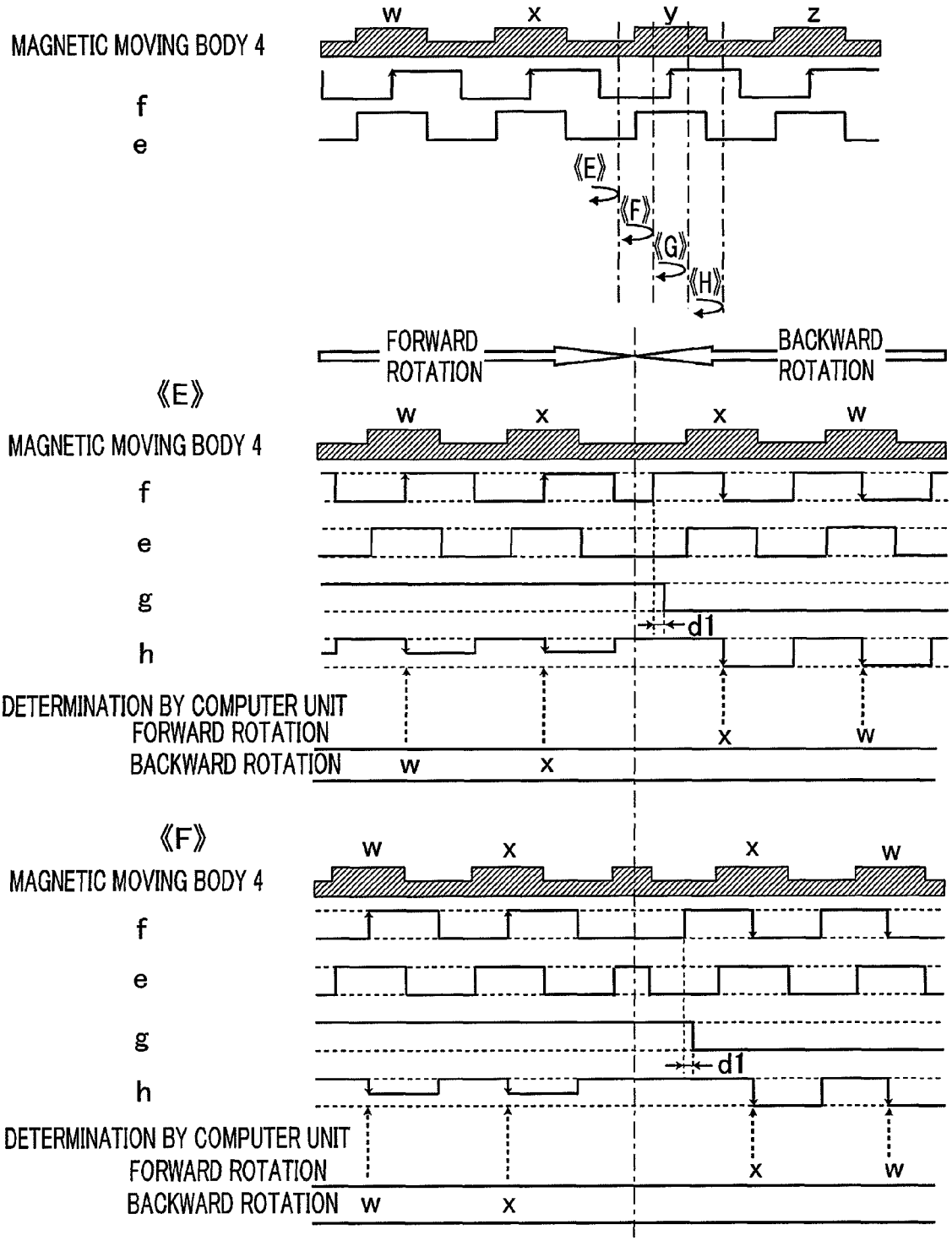

In FIG. 4A, as the switching timing when the magnetic moving body 4 changes its moving direction from the forward rotation to the backward direction, four timings (A, B, C, and D) are represented; FIGS. 4A and 4B represent the signals f, e, g, and h at the respective points in the circuit illustrated in FIG. 2 and determination performed by the computer unit 401. In FIGS. 5A and 5B, as the switching timing when the magnetic moving body 4 changes its moving direction from the backward direction to the forward rotation, four timings (E, F, G, and H) are represented; FIGS. 5A and 5B represent the signals f, e, g, and h at the respective points in the circuit illustrated in FIG. 2 and determination performed by the computer unit 401. Here, an explanation will be performed with reference to FIGS. 4A and 4B.

FIGS. 4A and 4B, in which symbols (s, t, u, and v) are allocated to the protrusive shapes of the teeth of the magnetic moving body 4, represent determination, performed by the computer unit 401 as an output determination unit, of the protrusive shape of the tooth of the magnetic moving body 4 and the moving direction thereof. The computer unit 401 performs determination of the moving direction based on the falling position and the level of the rectangular wave of the signal h. For example, in the case where the magnetic moving body 4 rotates forward at the timing A, the signal h falls at a timing corresponding to a position in the vicinity of the middle of the protrusive shape s of the tooth, whereby the computer unit 401 determines that the tooth is s at a timing during the forward rotation.

As can be seen from FIGS. 4A-A, 4A-B, 4B-C, and 4B-D, either when the magnetic moving body 4 rotates forward or when the magnetic moving body 4 rotates backward, the computer unit 401 recognizes the symbol s or t of the protrusion, at a timing corresponding to a position in the vicinity of the middle of the protrusive shape of the tooth; therefore, it is made possible to recognize the position of the protrusive shape of the tooth of the magnetic moving body 4.

In this situation, the magnetic moving body 4 may be either teeth-shaped or possessed of a magnetization pattern. Additionally, the optical system 4 may be either a rotating body or a linear body. In other words, anything having a uniquely defined moving direction can be adopted. In addition, the sensor element may be a hall element, a giant magnetoresistance (GMR) element, or a magnetoelectric conversion element such as a tunnel magnetoresistance (TMR) element.

As described above, regardless of the moving direction of the magnetic moving body 4 as a body to be detected, the falling position (switching position) of the rectangular wave of the signal h occurs at a timing corresponding to the position of the protrusive shape of the tooth; thus, the computer unit 401 can accurately recognize the position of the protrusive shape of the tooth of the magnetic moving body 4 as a body to be detected and can determine the moving direction of the magnetic moving body 4.

Moreover, the moving direction detector according to Embodiment 1 outputs the falling position (switching position) of the rectangular wave of the signal h at a timing corresponding to the position of the protrusive shape of the tooth; however, the same effect can be demonstrated even in the case where the phase of the rectangular wave of the signal h is inverted and the moving direction detector outputs the rising position (switching position) of the rectangular wave of the signal h at a timing corresponding to the position of the protrusive shape of the tooth.

Still moreover, in the moving direction detector according to Embodiment 1, depending on the moving direction, the low level of the rectangular wave of the signal h becomes a middle level that is neither the high level nor the low level. Even in the case where a level that is neither the high level nor the low level is outputted, the same effect can be demonstrated.

Embodiment 2

Figure 6:
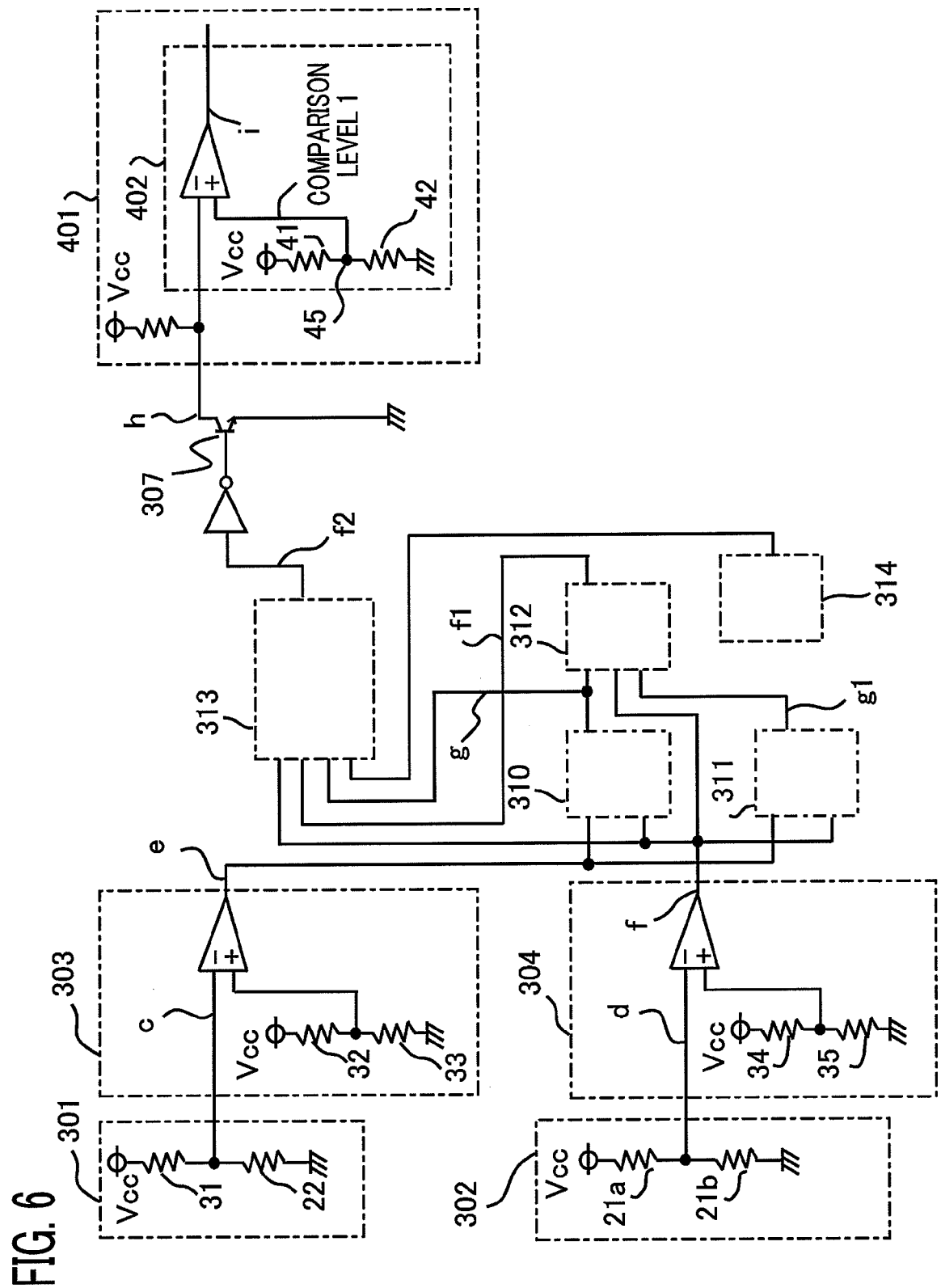
FIG. 6 is a circuit diagram illustrating a moving direction detector according to Embodiment 2 of the present invention.

A moving direction detector according to Embodiment 2 of the present invention will be explained below with reference to the accompanying drawings. FIG. 6 is a circuit diagram illustrating the configuration of a moving direction detector according to Embodiment 2 of the present invention. In addition, the same elements, among the elements in FIG. 6, which are the same as those in FIG. 2 are designated by the same reference characters.

As illustrated in FIG. 6, the moving direction detector according to Embodiment 2 is configured with a bridge circuit 301, a bridge circuit 302, a first comparison circuit 303, a second comparison circuit 304, a direction detection circuit 310, a mask determination circuit 311, an inverting circuit 312, a signal processing circuit 313, an oscillation circuit 314, an output transistor 307, and a computer unit 401. The computer unit 401 is provided with a third comparison circuit 402.

Figure 7A:
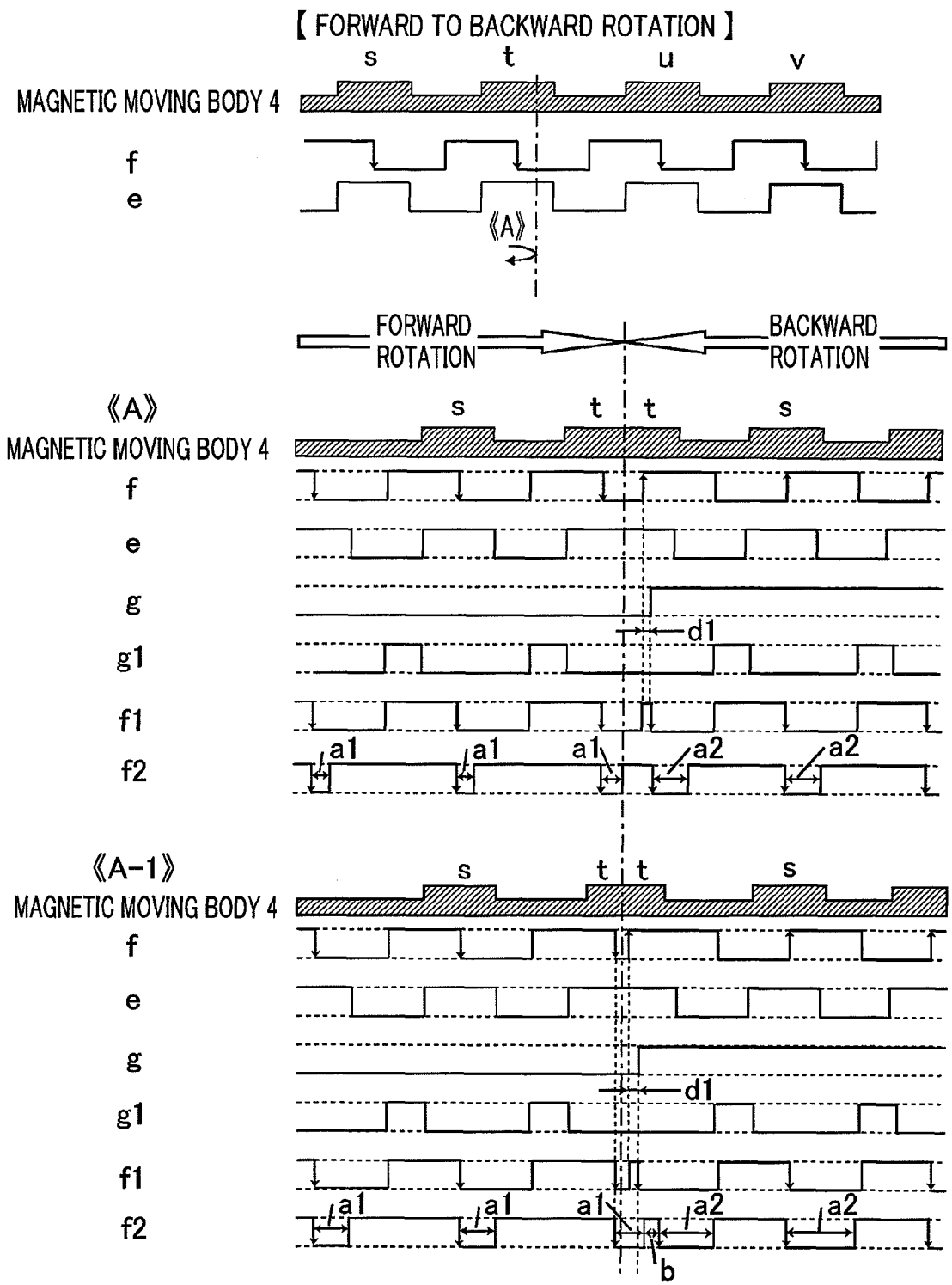

The operations of the respective units in FIG. 6 will be explained with reference to FIGS. 7A and 7B. The representation method of FIGS. 7A and 7B is the same as those of FIGS. 3A and 3B. An output signal g of the direction detection circuit 310 is a signal with which the moving direction of a magnetic moving body 4 is determined by checking, at the timings of the rising edge and the falling edge of a signal f, whether the waveform of a signal e is high-level or low-level. For example, in the case of the timing A in FIG. 7A, the direction detection circuit 310 outputs an output signal g of a high level at the rising edge of the signal f. The table, in FIG. 7B, for the direction detection circuit 310 represents the foregoing facts ("0" and "1" in FIG. 7B denote a low level and a high level, respectively, and the same, hereinafter).

As indicated by the signal g in FIG. 7A, the direction detection circuit 310 has a function of delaying the determination of the moving direction by duration d1.

The mask determination circuit 311 in FIG. 6 checks the level of the signal e at the timings of the rising edge and the falling edge of the signal f; in the case of a low level, the mask determination circuit 311 outputs an output signal g1 of a high level. However, when the level of the signal e changes to a high level, the mask determination circuit 311 outputs the output signal g1 of a low level, regardless of the rising timing or the falling timing of the signal f. The table, in FIG. 7B, for the mask determination circuit 311 represents the foregoing facts.

The inverting circuit 312 in FIG. 6 inverts the high level or the low level of the output signal f in accordance with the moving direction of the magnetic moving body 4. For example, in the case where the magnetic moving body 4 rotates forward, the output level of the signal f is maintained; in the case of the backward rotation, the high level of the signal f is inverted to the low level, and the low level of the signal f is inverted to the high level. Additionally, in the case where the signal g1 is high-level, the inverting circuit 312 outputs the signal f1 of a high level, regardless of the output level of the signal f. The table, in FIG. 7B, for the inverting circuit 312 represents the foregoing facts.

The oscillation circuit 314 in FIG. 6 is an oscillator that oscillates at a predetermined oscillation frequency; the output of the oscillation circuit 314 is inputted as a reference clock to the signal processing circuit 313.

The signal processing circuit 313 in FIG. 6 outputs a signal f2 of a low level, in synchronization with the falling edge of the signal f1; in the case where the signal g is low-level, the signal f2 rises up to a high level after duration a1 has elapsed; in the case where the signal g is high-level, the signal f2 rises up to the high level after duration a2 has elapsed. However, during each of the durations a1 and a2, the signal f2 does not synchronize with the falling edge of the signal f1, but falls after duration b has elapsed, as represented in the figure for the switching timing A-1 in FIG. 7A; then, in the case where the signal g is low-level, the signal f1 rises up to the high level after the duration a1 has elapsed, and in the case where the signal g is high-level, the signal f2 rises up to the high level after the duration a2 has elapsed.

The computer unit 401 in FIG. 6 determines that the low-level duration of the output signal h of the output transistor 307 is duration during which the magnetic moving body 4 rotates forward in the case where the duration a1 is detected, and determines that the low-level duration of the output signal h of the output transistor 307 is duration during which the magnetic moving body 4 rotates backward in the case where the duration a2 is detected.

The falling duration a2 is set within one-cycle duration (one cycle including one protrusion and one depression) determined by the rotation speed and the number of teeth (protrusions and depressions) of the magnetic moving body 4. The duration a1 is set in such a way as to be smaller than a2; for example, a1 is set in such a way that a1×2=a2. In a field where the magnetic moving body is actually utilized, the maximum value of the rotation speed, which is variable (e.g., 0 rpm to 10000 rpm), of the magnetic moving body 4 is determined by the specification, and the number of protrusions and depressions of the magnetic moving body is specified; therefore, the falling duration a2 is set within one-cycle duration determined by the maximum rotation speed and the number of the protrusions and depressions. However, because the reversal from the forward rotation to the backward rotation may be detected in a low-speed-rotation region, the duration a1 may be set within one-cycle duration determined by the rotation speed and the number of teeth (protrusions and depressions) of the magnetic moving body 4. Accordingly, the duration a1 or a2 is set within one-cycle duration (one cycle including one protrusion and one depression) determined by the rotation speed and the number of teeth (protrusions and depressions) of the magnetic moving body 4. As specific examples of a1 and a2, a1 and a2 are set to 30 μsec or 45 μsec, 60 μsec, 75 μsec, 90 μsec, 115 μsec, 120 μsec, 135 μsec, 150 μsec, 165 μsec, 180 μsec, or the like.

The durations a1 and a2 in the output signal f2 are generated in the signal processing circuit 313. As far as the beginning point of the duration is concerned, the output of the signal f2 rises in synchronization with the falling edge of the signal f1; as far as the terminating point of the duration is concerned, the number of the reference clocks are counted, and then after the duration a1 or a2, the output of the f2 rises in synchronization with the reference clock. However, in the case where, during the duration a1 where the signal f2 is low-level, an reversal between the forward rotation and the backward rotation occurs and the output of the direction detection circuit 310 reverses, the signal f2 does not rise in synchronization with the falling edge, of the signal f1, that occurs during the duration a1, but rises after the duration a1 (a low-level duration) of the signal f2; the number of the reference clocks are counted, and then after the duration b, the output of the f2 falls in synchronization with the reference clock; then, the number of the reference clocks are counted, and after the duration a2, the output of the f2 rises in synchronization with the reference clock. In the case where, during the duration a2 where the signal f2 is low-level, an reversal between the forward rotation and the backward rotation occurs and the output of the direction detection circuit 310 reverses, the signal f2 does not rise in synchronization with the falling edge, of the signal f1, that occurs during the duration a2, but rises after the duration a2 (a low-level duration) of the signal f2; the number of the reference clocks are counted, and then after the duration b, the output of the f2 falls in synchronization with the reference clock; then, the number of the reference clocks are counted, and after the duration a1, the output of the f2 rises in synchronization with the reference clock.

Figure 8A:
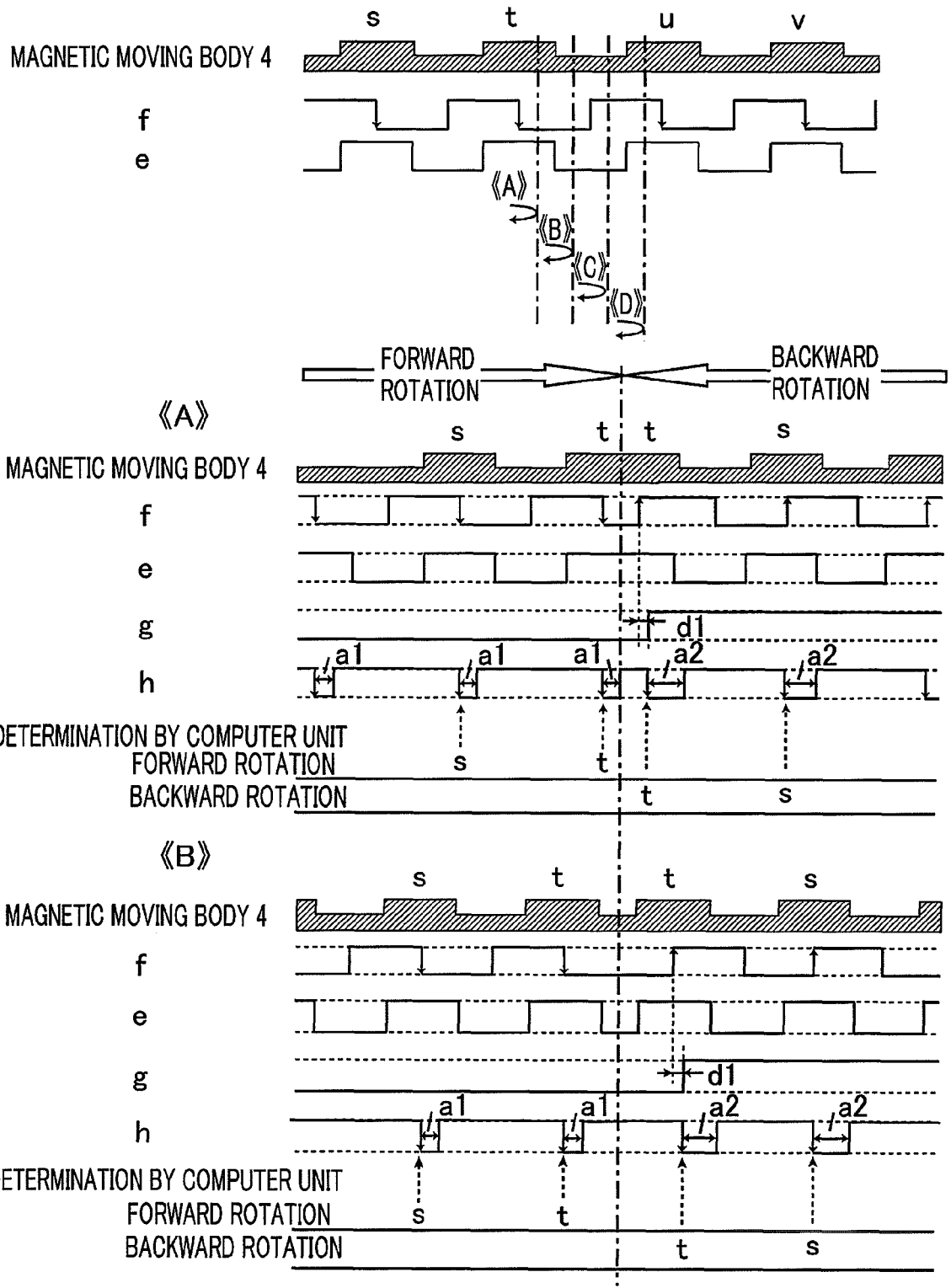
FIGS. 8A and 8*b* are each a set of charts representing waveforms at respective points in the circuit of a moving direction detector according to Embodiment 2, in the case where the moving direction changes from the forward rotation to the backward rotation.
Figure 8B:
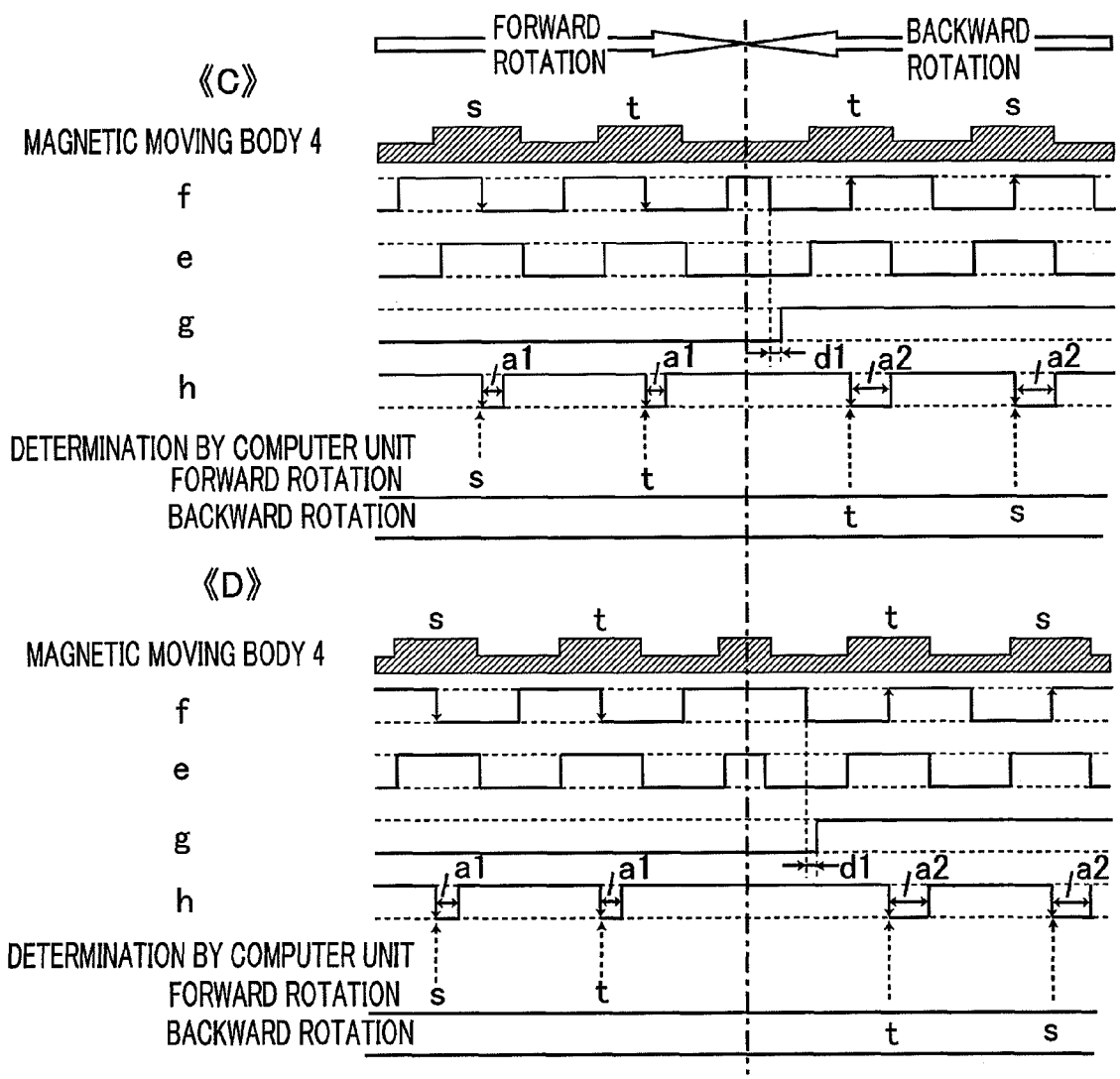
Figure 9A:
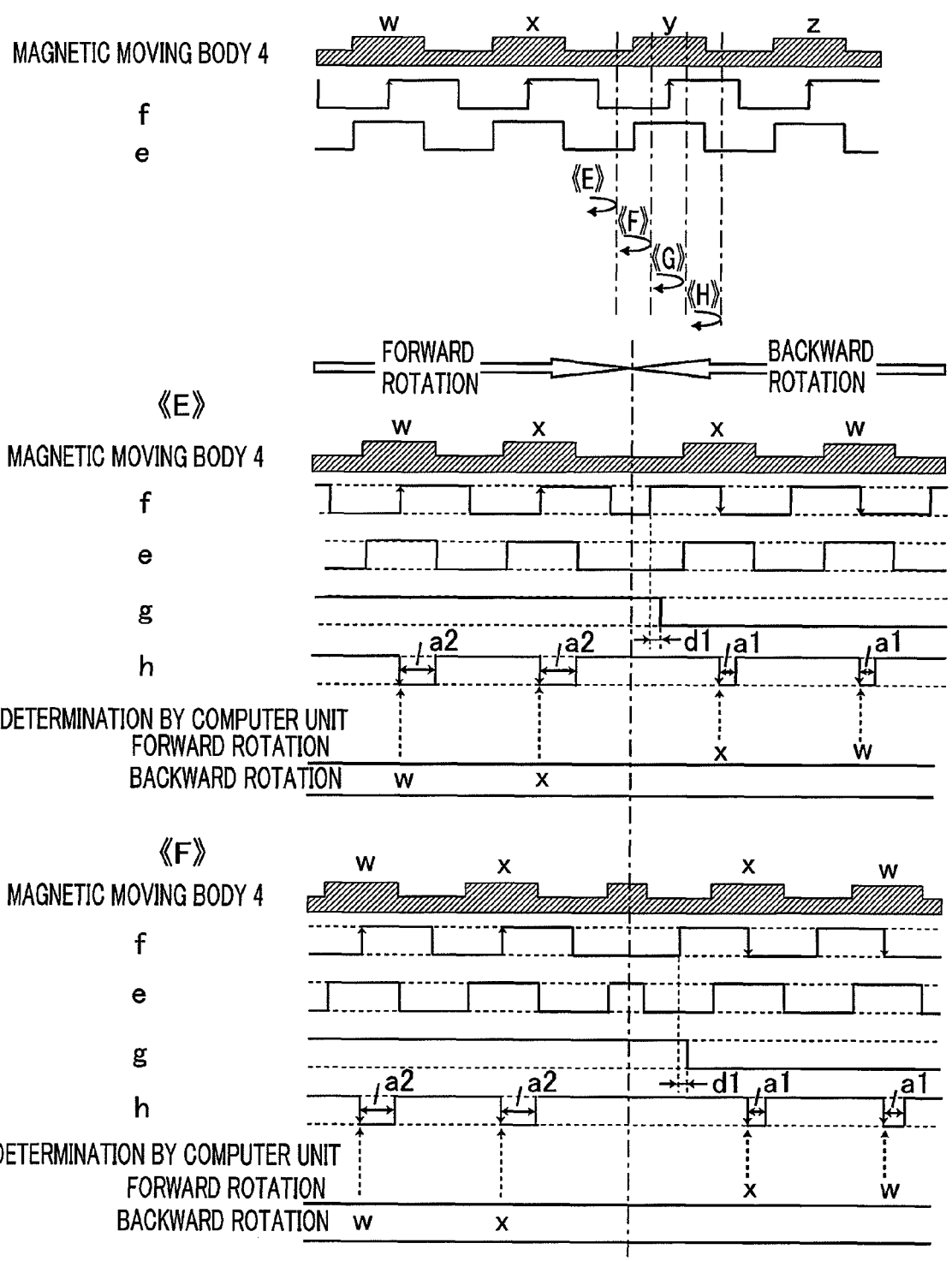
FIGS. 9A and 9B are each a set of charts representing waveforms at respective points in the circuit of a moving direction detector according to Embodiment 2, in the case where the moving direction changes from the backward rotation to the forward rotation.
Figure 9B:
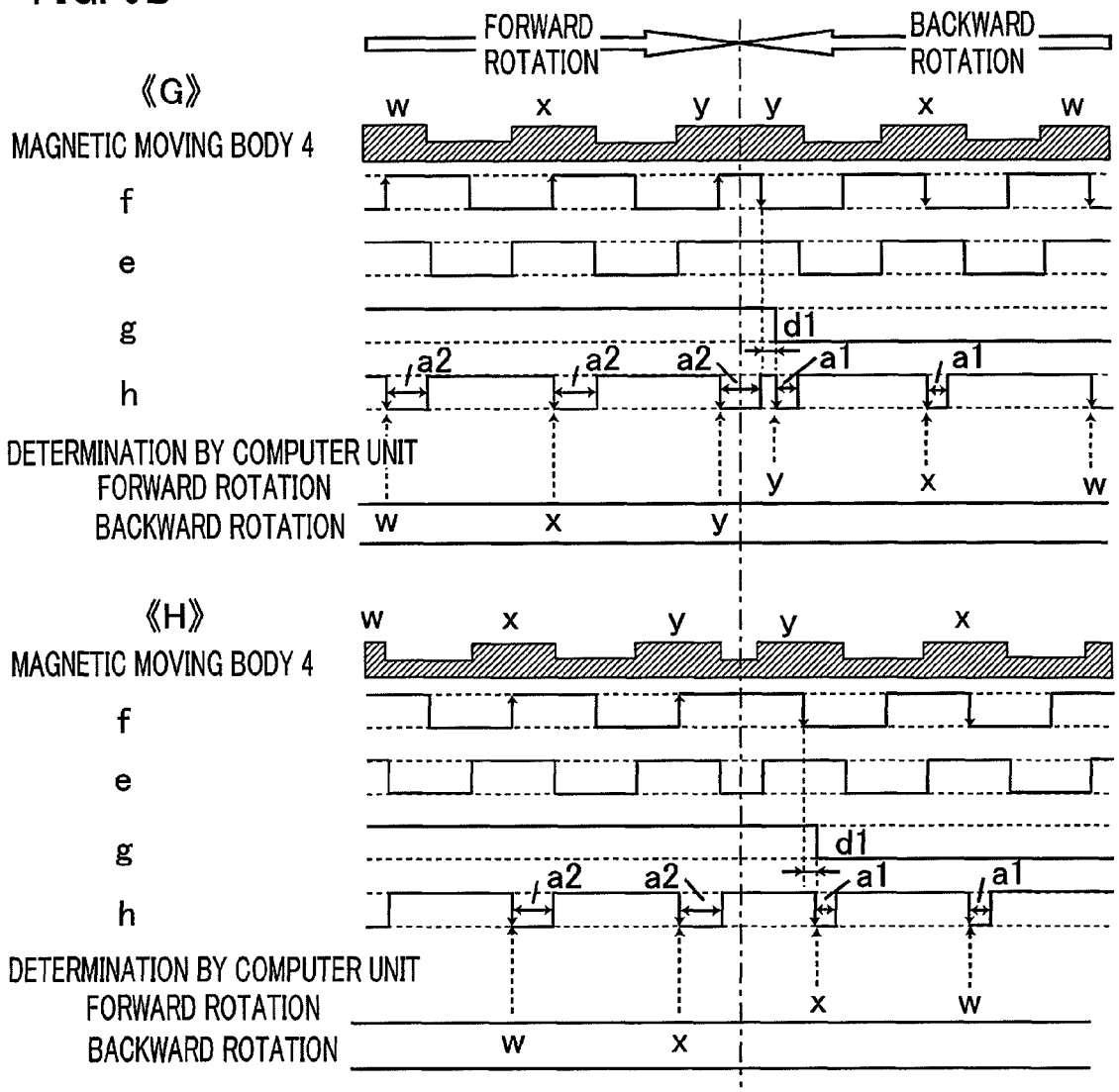

In FIG. 8A, as the switching timing when the magnetic moving body 4 changes its moving direction from the forward rotation to the backward direction, four timings (A, B, C, and D) are represented; FIGS. 8A and 8B represent the signals f, e, g, and h at the respective points in the circuit illustrated in FIG. 6 and determination performed by the computer unit 401. In FIGS. 9A and 9B, as the switching timing when the magnetic moving body 4 changes its moving direction from the backward direction to the forward rotation, four timings (E, F, G, and H) are represented; FIGS. 9A and 9B represent the signals f, e, g, and h at the respective points in the circuit illustrated in FIG. 6 and determination performed by the computer unit 401. Here, an explanation will be performed with reference to FIGS. 8A and 8B.

FIGS. 8A and 8B, in which symbols (s, t, u, and v) are allocated to the protrusive shapes of the teeth of the magnetic moving body 4, represent determination, performed by the computer unit 401, of the protrusive shape of the tooth of the magnetic moving body 4 and the moving direction thereof. The computer unit 401 performs determination of the moving direction based on the falling position and the low-level duration (it is assumed that the magnetic moving body rotates forward during the duration a1 and rotates backward during the duration a2) of the rectangular wave of the signal h. For example, in the case where the magnetic moving body 4 rotates forward at the timing A, the signal h falls at a timing corresponding to a position in the vicinity of the middle of the protrusive shape s of the tooth, and during the duration a1, the signal h is low-level; therefore, the computer unit determines that the tooth is s at a timing during the forward rotation.

As can be seen from FIGS. 4A-A, 4A-B, 4B-C, and 4B-D, either when the magnetic moving body 8 rotates forward or when the magnetic moving body 4 rotates backward, the computer unit 401 recognizes the symbol s or t of the protrusive shape of the tooth, at a timing corresponding to a position in the vicinity of the middle of the protrusive shape of the tooth; therefore, it is made possible to recognize the position of the protrusive shape of the tooth of the magnetic moving body 4.

In this situation, the magnetic moving body 4 may be either teeth-shaped or possessed of a magnetization pattern. Additionally, the optical system 4 may be either a rotating body or a linear body. In other words, anything having a uniquely defined moving direction can be adopted. In addition, the sensor element may be a hall element, a giant magnetoresistance (GMR) element, or a magnetoelectric conversion element such as a tunnel magnetoresistance (TMR) element.

In the moving direction detector according to Embodiment 2, regardless of the moving direction of the magnetic moving body 4 as a body to be detected, the falling position (switching position) of the rectangular wave of the signal h occurs at a timing corresponding to the position of the protrusive shape of the tooth; thus, there is demonstrated an effect that the computer unit 401 can accurately recognize the position of the protrusive shape of the tooth of the magnetic moving body 4 as a body to be detected and can determine the moving direction of the body to be detected.

Moreover, even in the case where, during the falling duration (a1, a2), the moving direction of the magnetic moving body 4 is switched, a predetermined falling duration (a1 or a2) is outputted after the duration b; therefore, there is demonstrated an effect that the computer unit 401 can accurately recognize the position of the protrusive shape of the tooth of the magnetic moving body 4.

In addition, in Embodiment 2, the falling durations are differentiated from each other based on the moving direction of the magnetic moving body 4; however, even in the case where the phase of the rectangular wave of the signal h is inverted and the rising durations are differentiated from each other based on the moving direction of the magnetic moving body 4, the same effect can be demonstrated.

Various modifications and alterations of this invention will be apparent to those skilled in the art without departing from the scope and spirit of this invention, and it should be understood that this is not limited to the illustrative embodiments set forth herein.

What is claimed is:

1. A moving direction detector comprising:
    first and second groups of sensor elements that face a moving body to be detected, arranged in a row along a moving direction of the moving body, and output detection signals in accordance with travel of the moving body, each of the first and second groups including one or more sensor elements;
    signal processing units that convert output signals of the first and second groups of sensor elements into rectangular waves;
    a moving direction detection unit that outputs a signal corresponding to a moving direction of the moving body, based on the detection signals from the first and second groups of sensor elements;
    output processing units that output signals with which a moving direction of the moving body can be determined, based on output signals of the signal processing units and an output signal of the moving direction detection unit; and
    an output determination unit that determines an output value of the output processing unit,
    wherein the moving direction detection unit has a delay function of generating an output signal at a time instant that is delayed by a predetermined time from a time instant when a moving direction of the moving body is changed, and
    wherein the duration of the high level or the low level of the rectangular wave is fixed to duration a1 or duration a2, and even in the case where a moving direction reverses during the duration a1 or the duration a2, the output processing unit outputs a rectangular wave having a fixed width of the duration a1 or a2 in accordance with a moving direction of the moving body, at a time instant that is delayed from the reversal by the duration a1 or a2.

2. The moving direction detector according to claim 1, wherein the first and second groups of sensor elements are configured with magnetoelectric conversion elements, and there is provided a magnet disposed for applying a magnetic field to the magnetoelectric conversion elements so that the moving body causes a change in the magnetic field produced by the magnet.

3. The moving direction detector according to claim 1, wherein the first and second groups of sensor elements are magnetoelectric conversion elements that detect a magnetic field, and the moving body is a magnetic moving body that is magnetized so as to apply a variable magnetic field to the magnetoelectric conversion elements.

4. The moving direction detector according to claim 1, wherein one of the first and second groups of sensor elements is configured with at least two sensor elements that are arranged spaced apart from each other by a predetermined distance along a moving direction of the moving body, and the other is configured with at least one sensor element that is disposed at a middle position of the distance between the sensor elements in the one of the first and second groups of sensor elements.

* * * * *